United States Patent

Baird et al.

Patent Number: 5,647,021
Date of Patent: Jul. 8, 1997

[54] IMAGE SEGMENTING APPARATUS AND METHODS

[75] Inventors: Henry Spalding Baird, Maplewood; Steven Jonathan Fortune, New Providence, both of N.J.; Susan Elizabeth Jones, Germantown, Md.

[73] Assignee: Lucent Technologies Inc., Murray Hill, N.J.

[21] Appl. No.: 489,399

[22] Filed: Jun. 12, 1995

Related U.S. Application Data

[62] Division of Ser. No. 870,740, Apr. 17, 1992, Pat. No. 5,430,808, and a division of Ser. No. 538,962, Jun. 15, 1990, abandoned.

[51] Int. Cl.⁶ .................................................. G06K 9/00
[52] U.S. Cl. .................................. 382/176; 382/282
[58] Field of Search .......................... 32/173, 175, 176, 32/177, 178, 179, 180, 197, 282, 283, 171, 172, 174, 190, 199, 203, 218, 224, 226, 286, 291, 293, 294, 295, 245, 305, 289, 227; 358/538, 433, 453, 449, 462

[56] References Cited

U.S. PATENT DOCUMENTS

| | | | |
|---|---|---|---|
| 4,899,394 | 2/1990 | Lee | 382/176 |
| 5,050,222 | 9/1991 | Lee | 382/21 |
| 5,054,091 | 10/1991 | Tanaka et al. | 382/9 |
| 5,285,504 | 2/1994 | Pavlidis et al. | 382/176 |

OTHER PUBLICATIONS

Aho et al., "The Design and Analysis of Computer Algorithms", 1974, pp. 172-188, Chapter 5, Algorithms on Graphs Addison-Wesley Publishing Company, Reading, Massachusetts.

*Primary Examiner*—Joseph Mancuso
*Assistant Examiner*—Bijan Tadayon
*Attorney, Agent, or Firm*—Gordon E. Nelson; Donald P. Dinella

[57] ABSTRACT

Apparatus and methods for producing segmentations of images which contain text. The general approach is to locate a first set of components which contain text characters, locate a second set of components which do not contain text characters, sort the second set using a characteristic shape, make a cover set from the sorted second set, and use the cover set to locate the portions of the image which contain text. An example application where the present method may be applied is to texts employing the Manhattan layout to locate columns of text. Parts of the image which do not contain text are located by constructing maximum empty rectangles which do not contain characters. Based on the observation that columns in Manhattan layouts are separated by rectangles with a high aspect ratio, the maximum empty rectangles are sorted in a manner which favors such rectangles to produce the cover set. The present technique is also useful in methods for locating maximum empty rectangles defined by points and for locating maximum empty rectangles defined by rectangles containing characters.

7 Claims, 19 Drawing Sheets

United States Patent [19]

Adams et al.

205(b)

[11] Patent Number: 4,866,714
[45] Date of Patent: Sep. 12, 1989

201

209

[54] PERSONAL COMPUTER-BASED DYNAMIC BURN-IN SYSTEM

[75] Inventors: Jerry G. Adams, Brooksville; Robert P. Gibson, Palm Harbor, both of Fla.; Denis A. Mueller, Asheville, N.C.

[73] Assignee: Westinghouse Electric Corp., Pittsburgh, Pa.

[21] Appl. No.: 108,672

205(c)

[22] Filed: Oct. 15, 1987

[51] Int. Cl.⁴ .................... G06F 11/00; G01R 31/28
[52] U.S. Cl. .................................. 371/22.1; 371/16.1
[58] Field of Search ............ 371/16, 20, 25, 28; 324/73 R, 73 AT, 73 PC; 364/551, 579, 580

[56] References Cited

U.S. PATENT DOCUMENTS

| | | | |
|---|---|---|---|
| 4,627,056 | 12/1986 | Awane et al. | 371/16 |
| 4,694,408 | 9/1987 | Zaleski | 364/551 |
| 4,706,208 | 11/1987 | Helms | 364/580 |
| 4,709,366 | 11/1987 | Scott et al. | 371/20 |
| 4,713,815 | 12/1987 | Bryan et al. | 371/209 |
| 4,718,064 | 1/1988 | Edwards et al. | 371/20 |

205(a)

OTHER PUBLICATIONS

G. Ost, The Practice and Economy of Burn-In, Electronic Engineering, Aug. 1986, pp. 37–43.
Park, Effect of Burn-In on Mean Residual Life, IEEE Trans. on Reliability, vol. R-34, No. 5, Dec. 1985, pp. 522–523.

Primary Examiner—Charles E. Atkinson
Attorney, Agent, or Firm—C. M. Lorin

211

[57] ABSTRACT

An installation for the dynamic burn-in testing of a plurality of digital circuits, and/or microcomputer-controlled circuits, mounted in a burn-in chamber for testing includes a personal computer; power supply for the digital circuits, and a bilateral line of communication between the PC computer and each of the digital circuits; the PC computer interrogating separately, and at will, any of the digital circuits as to their status and capability of changing status while retrieving any indication of a critical testing condition from any digital circuit, to determine a failure-free burn-in time.

207

7 Claims, 27 Drawing Sheets

FIG. 3

United States Patent [19]
Adams et al.

[11] Patent Number: 4,866,714
[45] Date of Patent: Sep. 12, 1989

[54] PERSONAL COMPUTER-BASED DYNAMIC BURN-IN SYSTEM

[75] Inventors: Jerry G. Adams, Brooksville; Robert P. Gibson, Palm Harbor, both of Fla.; Denis A. Mueller, Asheville, N.C.

[73] Assignee: Westinghouse Electric Corp., Pittsburgh, Pa.

[21] Appl. No.: 108,672

[22] Filed: Oct. 15, 1987

[51] Int. Cl.$^4$ .................. G06F 11/00; G01R 31/28
[52] U.S. Cl. .................................... 371/22.1; 371/16.1
[58] Field of Search ............ 371/16, 20, 25, 28; 324/73 R, 73 AT, 73 PC; 364/551, 579, 580

[56] References Cited
U.S. PATENT DOCUMENTS

| | | | |
|---|---|---|---|
| 4,627,056 | 12/1986 | Awane et al. | 371/16 |
| 4,694,408 | 9/1987 | Zaleski | 364/551 |
| 4,706,208 | 11/1987 | Helms | 364/580 |
| 4,709,366 | 11/1987 | Scott et al. | 371/20 |
| 4,713,815 | 12/1987 | Byran et al. | 371/209 |
| 4,718,064 | 1/1988 | Edwards et al. | 371/20 |

OTHER PUBLICATIONS

G. Ost, The Practice and Economy of Burn-In, Electronic Engineering, Aug. 1986, pp. 37-43.
Park, Effect of Burn-In on Mean Residual Life, IEEE Trans. on Reliability, vol. R-34, No. 5, Dec. 1985, pp. 522-523.

Primary Examiner—Charles E. Atkinson
Attorney, Agent, or Firm—C. M. Lorin

[57] ABSTRACT

An installation for the dynamic burn-in testing of a plurality of digital circuits, and/or microcomputer-controlled circuits, mounted in a burn-in chamber for testing includes a personal computer; power supply for the digital circuits, and a bilateral line of communication between the PC computer and each of the digital circuits; the PC computer interrogating separately, and at will, any of the digital circuits as to their status and capability of changing status while retrieving any indication of a critical testing condition from any digital circuit, to determine a failure-free burn-in time.

7 Claims, 27 Drawing Sheets

301

IMAGE SEGMENTING APPARATUS AND METHODS

CROSS-REFERENCE TO RELATED APPLICATION

This is a division of applications Ser. Nos. 07/870,740 and 07/538,962 filed Apr. 17, 1992 and Jun. 15, 1990, now patented (U.S. Pat. No. 5,430,808), and abandoned, respectively.

The methods and apparatus described herein may be implemented using techniques described in U.S. Ser. No. 07/194,686, Henry S. Baird, *Apparatus and Method for Skew Control of Document Images*, filed May 16, 1988 and assigned to the assignee of the present application, now U.S. Pat. No. 5,001,766.

BACKGROUND OF THE INVENTION

A problem of increasing importance in computer technology is the extraction of information from images which are represented as arrays of pixels (picture element intensity values). On the one hand, computer technology has successfully automated the acquisition, storage, and transmission of images of documents; on the other hand, it has even roe successfully automated the storage and manipulation of information represented by strings of digital codes representing text characters.

What has been much less successfully automated is the conversion of character information in images into character-string data. Often, the same technique is used as was used to convert character information on pieces of paper into character-string data: a data entry clerk reads the image and uses a keyboard to enter character-string data equivalent to the information on the image into a data base. The difficulties with this procedure are obvious: it is expensive, slow, and error-prone.

An important component of the technology of extracting information from images is image segmentation, i.e., the division of an image into portions having different properties. FIG. 1 shoes how apparatus which performs image segmentation is used in a system 101 for extracting character information from images. Image 103 is an image which is represented in the memory of a data processing system as an array of pixels. It serves as an input to segmenter 107, a program executing in a processor of the data processing system. Segmenter 107 produces a segmentation of image 103 in which text columns 105 are separated from non-text 106. A text column in the present contest is one or more lines of text. In the case of a multi-line column, the lines making up the column are arranged with reference to a common vertical line. Non-text 106 may be white space or it may be illustrations, ornamental borders, patterns, or the like. The output from segmenter 107 is text column images 109, which are portions of image 103 which contain only text columns 105. Text column images 109 are then used as input to text column analyzer 111, another program executing in a processor of the data processing system. Given images of text columns, text analyzer 111 is able to interpret the images as characters, words, and lines and output digital character codes 113 corresponding to the text in the text images. The digital character codes 113 are then generally output to a text file 115. The digital character codes produced by text analyzer 111 may of course be manipulated by the data processing system in the same fashion as any other character codes. A state-of-the-art text column analyzer 111 is described in Henry S. Baird, "Global-to-Local Layout Analysis", in *Proceedings of the IAPR Workshop on Syntactic and Structural Pattern Recognition*, Pont-a-Mousson, France, 12–14 Sep. 1988, which is incorporated herein by reference.

Segmenter 107 is a necessary component of system 101 because text column analyzer 111 presumes that the images it is receiving represent exactly one column of text. Consequently, if text column analyzer 111 receives more than one text column 105 or non-text 106 as input, it may fail. If the input is multiple text columns 105, text column analyzer 111 may not be able to locate the lines of text, and even if it does, it will not read them in the correct order. If the input is non-text 106, text column analyzer 111 may interpret illustrations, ornamental borders, other non-textual material, or even spots of "dirt" as text. In the best case, text column analyzer 111 will fail, and will merely have wasted time and processing resources. In the worst case, text column analyzer 111 will succeed. When that happens, text column analyzer 111 may add non-existent characters to the text being extracted from the image or may even completely misinterpret the text in the image.

1. Field of the Invention

The invention relates broadly to the art of extracting information from images represented as arrays of pixels and more specifically to the art of segmenting such images in order to simplify the extraction of information from them. The techniques of the invention are particularly useful for segmenting images which contain text.

2. Description of the Prior Art

A recent survey of techniques for segmenting images which contain text, S. N. Srihari and G. W. Zack, "Document Image Analysis", *Proceedings, 8th International Conference on Pattern Recognition*, Paris, France, October 1986, pp. 434–436, divides fully-automatic segmentation techniques into two broad categories: top-down and bottom-up. Top-down techniques begin by making high-level hypotheses about the location of text in the image (for example, that there will be double-column text with a header). They then make trees of lower-level hypotheses based on the high-level hypotheses, and continue thus downward until they reach a level where the correctness of a hypothesis may be determined by examining the document image. If the document image does not support the hypothesis, the top-down techniques back up in the tree until they reach a level which was not demonstrated false by the document image and attempt another branch of the tree. As is obvious from the foregoing, if there; is a bad match between the high-level hypotheses and the actual form of the document, it will take a program using top-down techniques a great deal of time to determine the location of the text.

Bottom-up techniques begin by locating images of characters. They then form characters into words, words into lines, lines into columns, and so forth. The problem with these techniques is that they have no global view of the text in the document, and therefore often make mistakes concerning what characters make a word, what words make a line, what lines make a column, and so forth. The art has attempted to deal with these problems by using rules to prevent certain classes of mistakes. What is needed, and what is provided by the apparatus and methods disclosed herein, are techniques for segmentation which combine the simplicity and speed of the bottom-up techniques with the global view of the top-down techniques.

SUMMARY OF THE INVENTION

In generic terms, the invention is a method for producing a segmentation of an image belonging to a class of images which is defined by the shapes of components of the images belonging to the class, the method comprising the steps of:

locating a first set of first components of the image;

locating a second set of second components of the image, each of the second components being a component which does not include or overlap any of the first components; and producing the segmentation by means of an analysis of the second set which uses shape information characteristic of the image's class.

Apparatus for producing the segmentation comprises:

means for locating a first set of first components of the images;

means for locating a second set of second components of the image, each of the second components being a component which does not include or overlap any of the first components; and means for producing the segmentation by means of an analysis of the second set which uses shape information characteristic of the image's class.

In one species of the invention, the technique is applied to images in which the first components are rectangles containing text characters and the second components are the locally-largest rectangles which may be constructed in the image which do not overlap or contain any of the rectangles containing text characters. The shape information in this species is shape information which describes second components which are particularly characteristic for the non-text portion of the image. A class of images for which the species is particularly well adapted is the class of Manhattan layouts. In that class, the shape information describes second components with high aspect ratios.

In another aspect of the invention, the second components in the species are obtained using new methods for finding maximum empty rectangles in an image. One of the methods may be employed to find maximum empty rectangles defined by points; the other may be employed to find maximum empty rectangles defined by rectangles.

It is thus an object of the invention to provide improved processing of digital images;

it is another object of the invention to provide improved apparatus and methods for producing segmentations of images;

it is a further object of the invention to provide apparatus and methods for producing segmentations which employ shape information which is characteristic for a class of images; and it is an additional object of the invention to provide methods for finding maximum empty rectangles in an image.

Other objects and advantages of the invention will be clear to those of ordinary skill in the art upon consideration of the Drawing and the Detailed Description.

BRIEF DESCRIPTION OF THE DRAWING

FIG. 2 is an example of a Manhattan layout

FIG. 3 shows a cover set in the example of FIG. 2.

Figure 1:
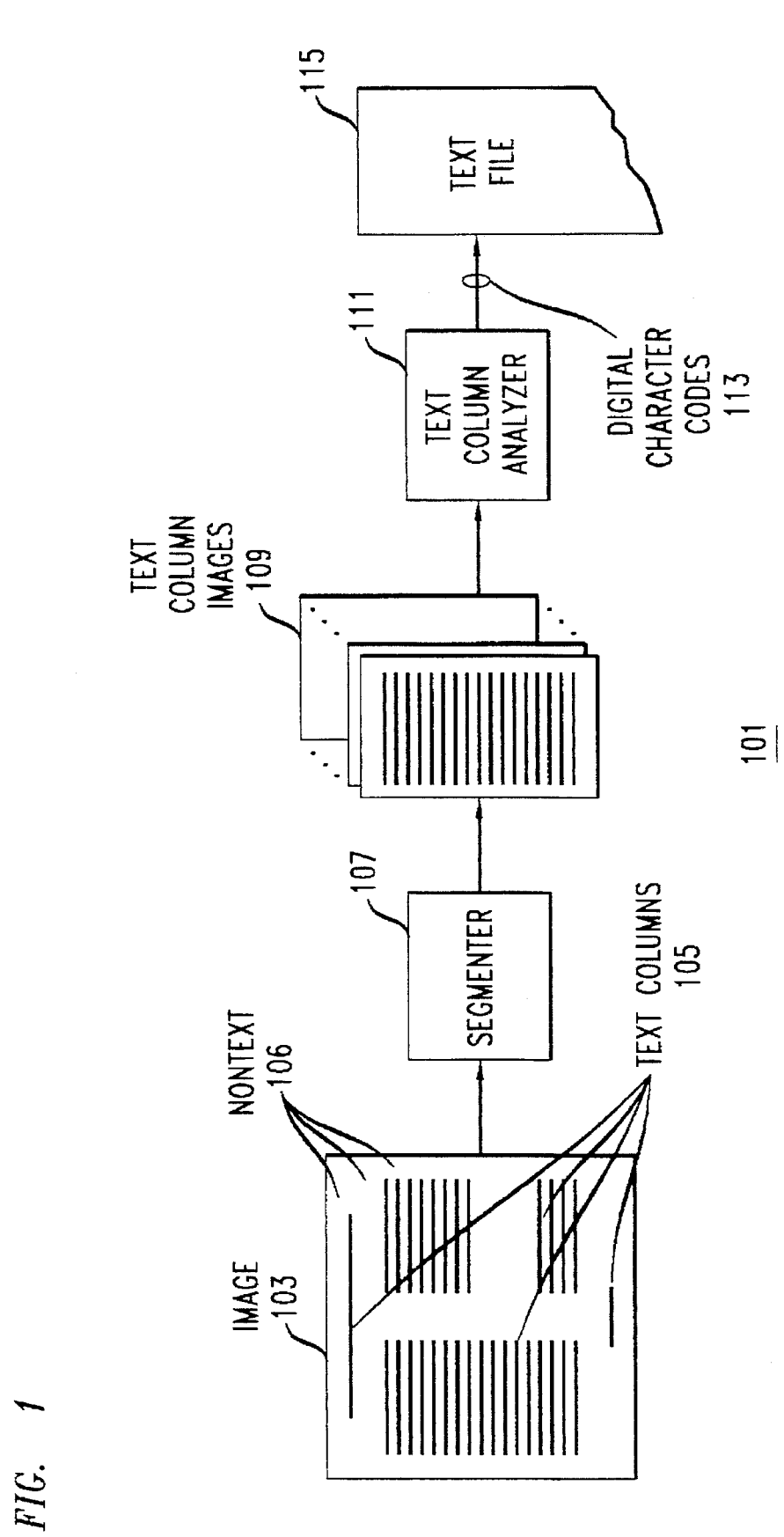
FIG. 1 is a block diagram of a system for extracting character information from an image.

The rightmost two digits of a reference number specify a number within a figure; the remaining digits specify the figure number, thus, the item labeled 107 is first shown in FIG. 1

DETAILED DESCRIPTION

The following Detailed Description of a preferred embodiment will first provide an overview of an embodiment which performs segmentation on documents having the common Manhattan layout, will then discuss a new technique for finding maximum empty rectangles which is employed in the embodiment, will next discuss an adaptation of this technique used in segmenter 107 of the preferred embodiment, and will then show how the maximum empty rectangles obtained from a Manhattan layout are sorted by shape to obtain a cover set which defines non-text 106 in the Manhattan layout.

The Manhattan Layout: FIGS. 2 and 3

A Manhattan layout is one which can be segmented by a set of vertical and horizontal line segments. As is clear from this definition, most standard book, journal, and newspaper layouts belong to this class of layouts, as do most business letter and business form layouts. FIG. 2 shows one example of a Manhattan layout, namely, a part of the first page of U.S. Pat. No. 4,866,714. For purposes of the following discussion, Manhattan layout 201 can be divided into the following components:

character rectangle 203, a rectangle which contains a single printed character, in this case, "U";

word 211, a set of character rectangles 203 representing a word;

line 209, a set of words on a single horizontal line of a column;

column 207, a set of lines 209 situated one above the other, and maximum empty rectangles 205(a–c), examples of maximum empty rectangles.

A maximum empty rectangle is any rectangle which can be drawn in Manhattan layout 201 such that each of the rectangle's four sides is touching an edge of the Manhattan layout or a side of of a character rectangle.

As will be described in more detail below, segmenter 107 in the preferred embodiment works by obtaining the set of maximum empty rectangles 205 in Manhattan layout 201, sorting the maximum empty rectangles according to shape, and combining a subset of the sorted maximum empty rectangles to obtain a cover set which covers all portions of Manhattan layout 201 but those occupied by lines and columns of text. FIG. 3 shows cover set 301 for the Manhattan layout of FIG. 2. All of the space in FIG. 3 outside the boxes enclosing the characters, lines, and columns of FIG. 3 belongs to cover set 301.

Figure 4:
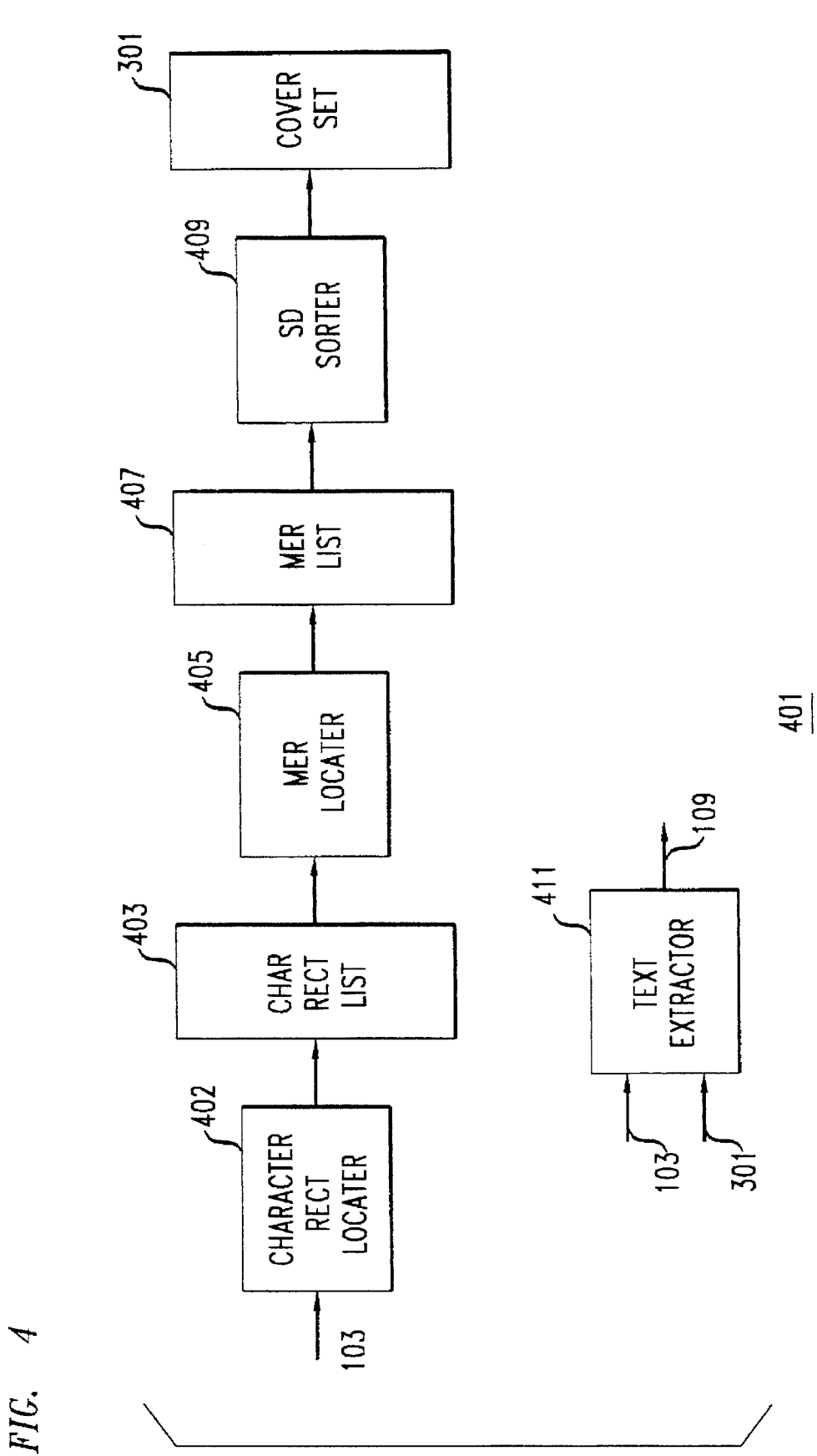
FIG. 4 is a block diagram of a segmenter in which the inventions may be employed.

Overview of Segmenter 107 in a Preferred Embodiment: FIG. 4

FIG. 4 is a block diagram of Segmenter 401, an embodiment of Segmenter 107 of FIG. 1 which employs the principles of the invention. Segmenter 401 receives text image 103 as an input and produces text column images 109 as output. In a preferred embodiment, text image 103 has Manhattan layout 201 and text column images 109 are columns 207 (including single-line columns 207) from layout 201.

The first component of segmenter 401 is character rectangle locator 402, which produces a list 403 of rectangles 203 containing characters in image 103. The rectangles 203 are described by the x,y coordinates of their lower left-hand and upper right-hand corners and list 403 is ordered on y,x as follows: The pixel in a given rectangle 203 which is used to determine the order of the rectangle in list 403 is the last pixel in the rectangle when all of the pixels are ordered in ascending lexicographical order by y,x; the order of those pixels in list 403 is again lexicographically by y,x.

Character rectangle list 403 is the input to maximum empty rectangle (MER) locator 405, which locates all of the maximum empty rectangles 205 in image 103 and outputs their locations to maximum empty rectangle list 407. The maximum empty rectangles in list 407 are again described by the coordinates of their lower left-hand and upper right-hand corners. List 407 is used as input to shape-directed (SD) sorter 409 which sorts the maximum empty rectangles 205 in list 407 by a shape which is characteristic of image 103. In the preferred embodiment, the characteristic shape for Manhattan layout 201 is a high-aspect ratio rectangle. A predetermined subset of the maximum empty rectangles 205 in the sorted list are merged to form cover set 301. Cover set 301 and image 103 are then input to text extractor 411. The parts of image 103 which do not belong to cover set 301 are of course the lines 209 and columns 207 of image 103, and these are output as text column images 109 to text column analyzer 111.

As may be seen from the foregoing, in processing image 103, segmenter 401 performs the following steps:

it makes a list of rectangles 203 containing characters in image 103;

it uses rectangles 203 to determine the set of maximum empty rectangles 205 in image 103;

it sorts the set of maximum empty rectangles by shape, in this case, by aspect ratio;

it combines a predetermined subset of the sorted maximum empty rectangles to produce cover set 301; and it employs cover set 301 together with image 103 to locate lines 209 and columns 207 of text in image 103.

In the following, the components of segmenter 401 will be discussed in detail.

Figure 5:
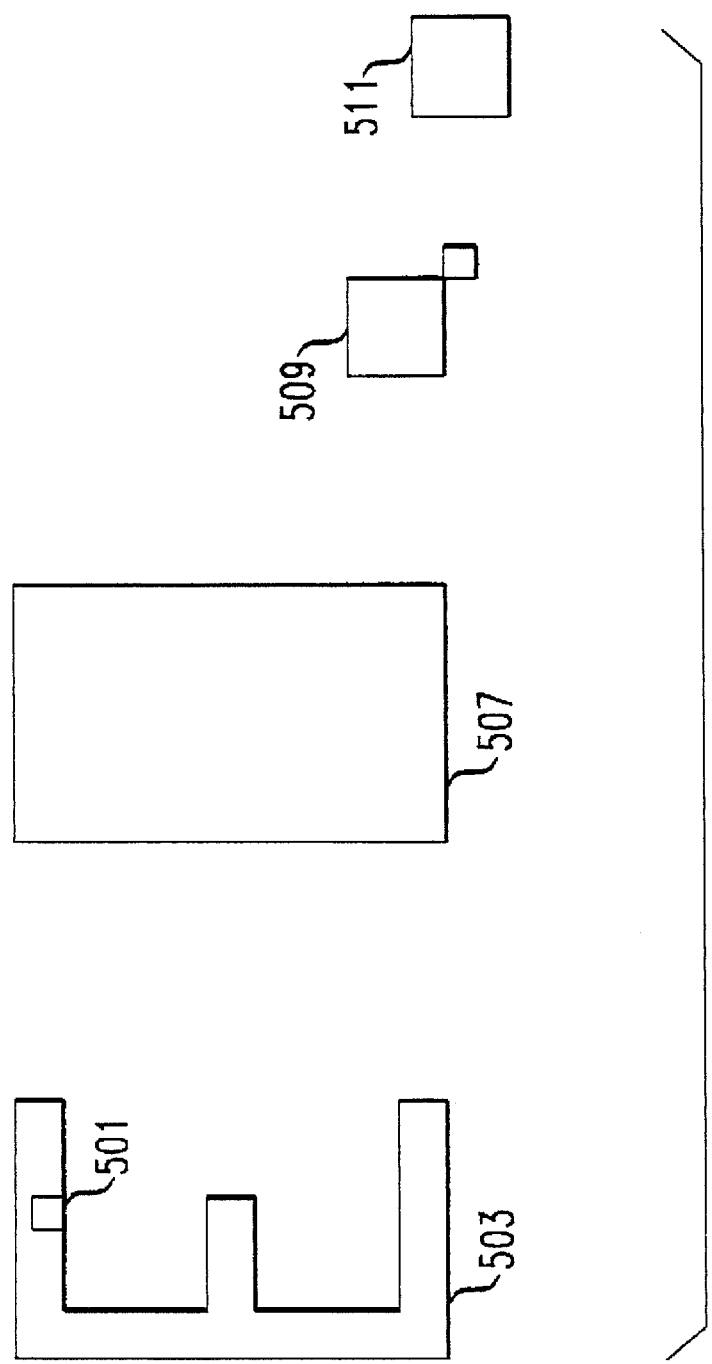
FIG. 5 is a diagram of the relationship between a character and a character rectangle.

Character Rectangle Locater 402: FIG. 5

Character rectangle locater 402 analyzes image 103 to locate character rectangles 203. The first step is to locate the characters. This is done as follows: First, the image is analyzed to find connected components ("blobs") which have the color employed in the image for the text. A connected component of an image is a maximal subset of pixels of the same color which touch each other either directly or indirectly. In a preferred embodiment, the connected components are 8-connected, i.e., the pixels may touch either horizontally, vertically, or diagonally. In other embodiments, other degrees of connectedness may be employed. Analysis for connectedness is conventional. One technique for performing it is described in Ronse, C. and Devijver, P., *Connected Components in Binary Images: The Detection Problem*, Research Studies Press, Letchworth, Hertforshire, England, 1984. FIG. 5 shows the result of connectedness analysis on character 503. Every pixel 501 in character 503 is eight-connected; consequently, character 503 is a "blob". The next step is to idealize blob 503 into black rectangle 507. Black rectangle 507 is large enough to contain blob 503 and therefore the character. All black rectangles 507 which are too large or too small to contain a text character are discarded. In FIG. 5, 509 is a blob of 8-connected pixels which are not characters and 511 is the black rectangle into which it is idealized and which is discarded because it is too small to contain a text character.

The next step is to correct for any skew or shear distortion in image 103. There are several methods known in the an for doing this. The one employed in a preferred embodiment is described in Henry S. Baird, "The Skew Angle of Printed Documents", *Proceedings*, 1987 *Conference of the Society of Photographic Scientists and Engineers*, Rochester, N.Y., May 20–21, 1987. Once the distortion correction is done, the correct x,y coordinates of all the black rectangles 507 in image 103 are known and character rectangle list 403 may be constructed as described above.

Maximum Empty Rectangle Locater 405

The following discussion of maximum empty rectangle locater 405 will begin with a description of a new algorithm for locating maximum empty rectangles 205 which are defined by points i in an image and then disclose the manner in which the algorithm has been adapted to be used to locate maximum empty rectangles 205 which are defined by character rectangles 203.

Figure 6:
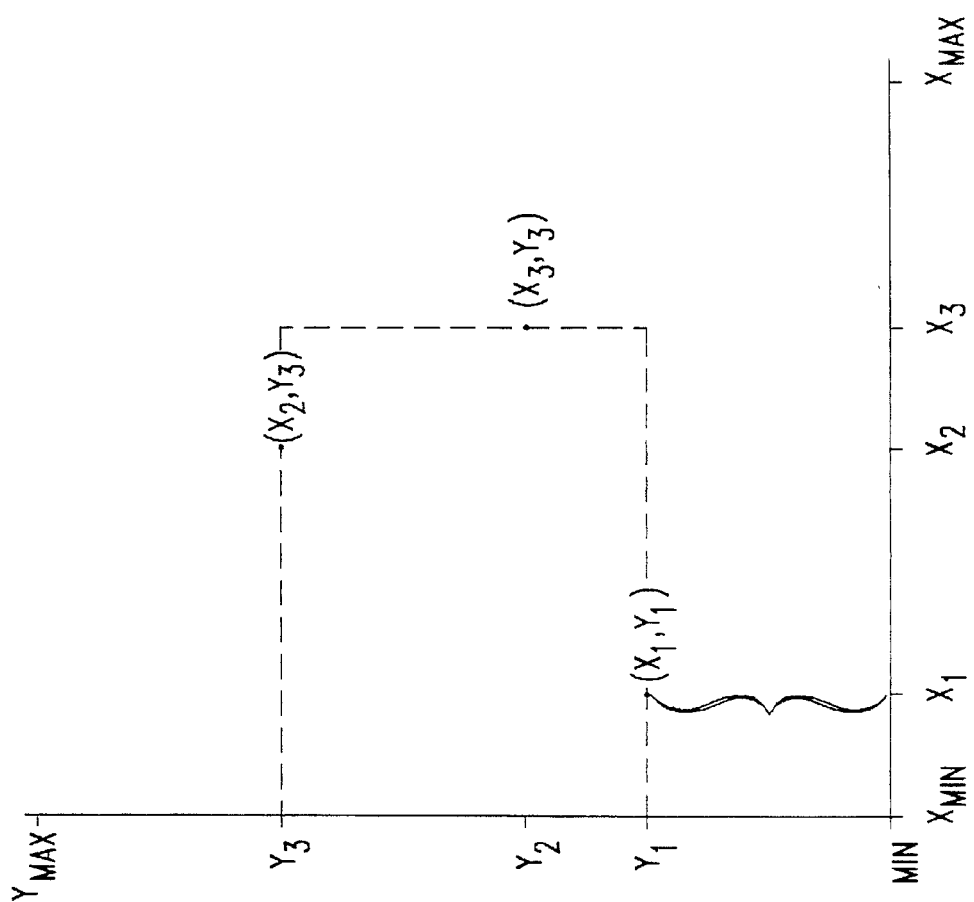
FIG. 6 is a diagram of an image with a set of points.
Figure 7:
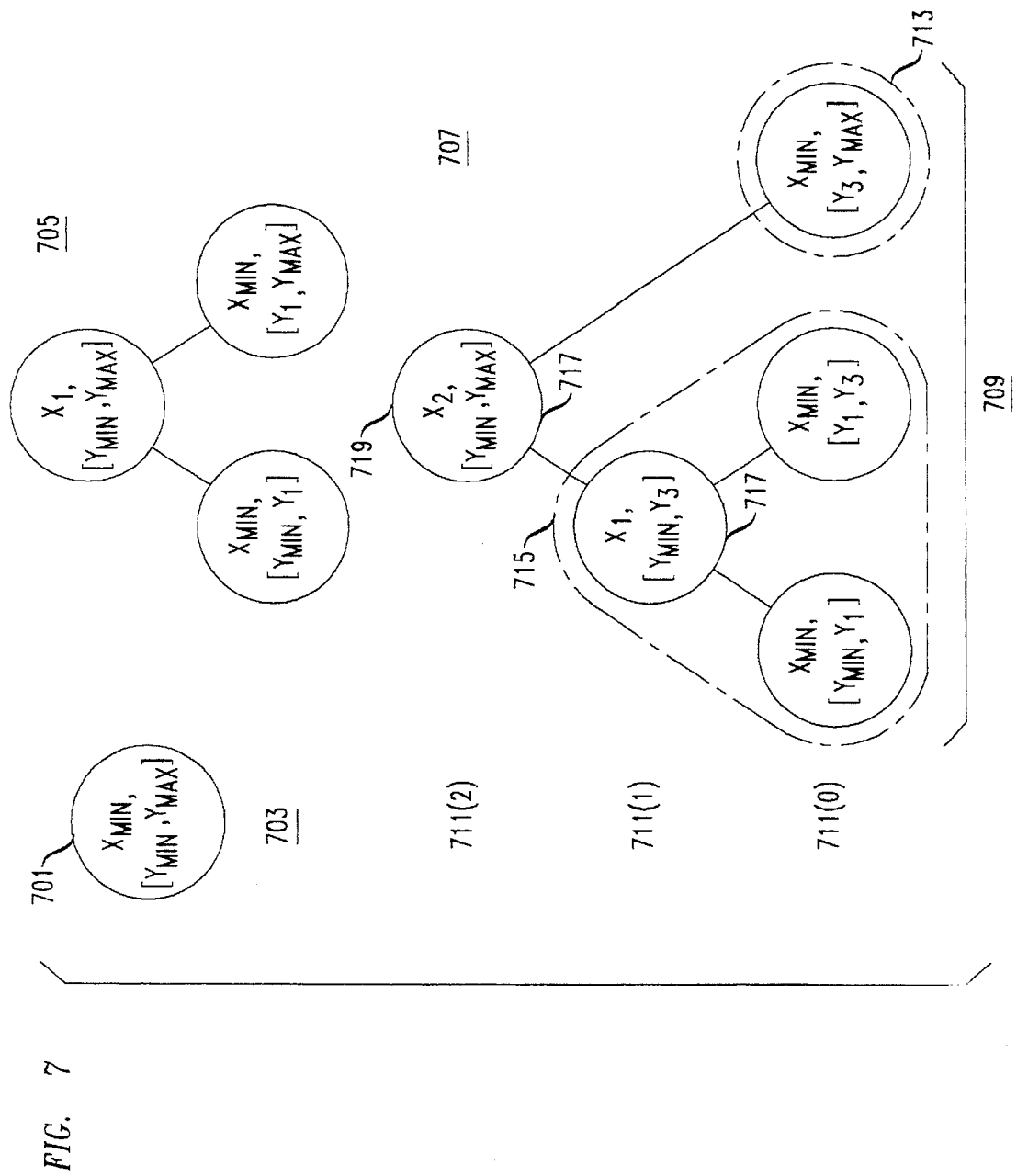
FIG. 7 is a diagram of trees of active rectangles.
Figure 8:
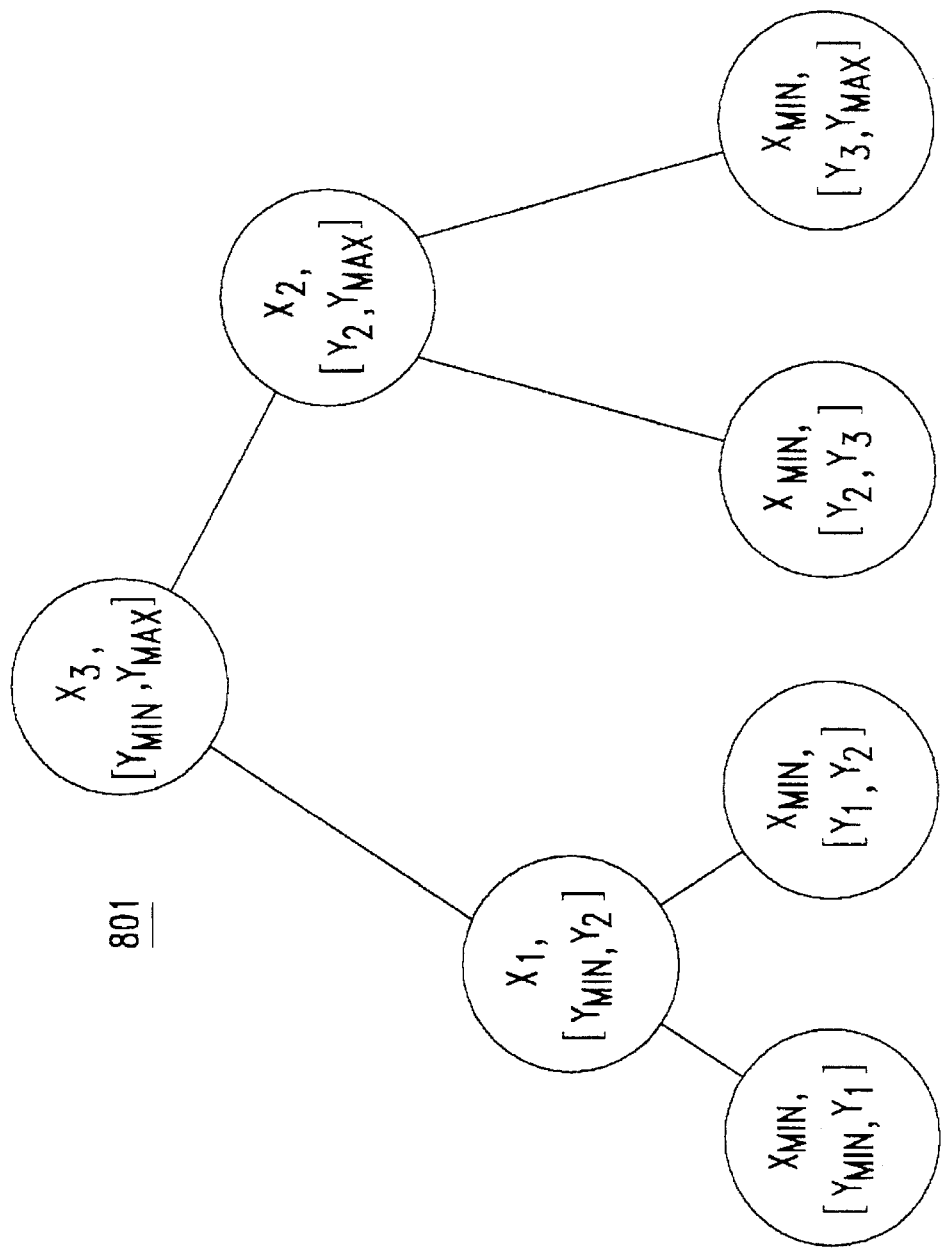
FIG. 8 is a diagram of a tree of active rectangles.

Locating Maximum Empty Rectangles: FIGS. 6–8

FIG. 6 shows an image 601 which has been assigned x,y coordinates ranging from $x_{min}$ to $x_{max}$ and $y_{min}$ to $y_{max}$. There are three points on the image, (x1,y1), (x2,y3), and (x3,y2). A maximum empty rectangle in FIG. 6 is a rectangle each of whose four sides is bounded either by one of the three points or one of the bounds of the image. Thus, maximum empty rectangle 605 is bounded by the y axis and by the three points (x1,y1), (x2,y3), and (x3,y2). Here and in the following, maximum empty rectangles are specified by the coordinates of their lower left- and upper right-hand corners. In the case of maximum empty rectangle 605, the coordinates are (xmin,y1;x3,y3). At a given point on the x axis, an active rectangle is an rectangle whose right-hand side has not yet encountered a bound. Thus, at point x3, rectangle 607 is still active. Here and in the following, active rectangles are specified by the x coordinate of their left-hand side and two y-coordinates indicating an interval 603 on the y axis. Active rectangle 607, for instance, is specified by (xmin,[y3,ymax]).

The algorithm described in the following applies where none of the points has the same x or y coordinate as another of the points. Conceptually, the algorithm locates maximum empty rectangles by sweeping a line parallel to the y axis from left to right across the image. Each time a point is encountered in the image, the active rectangles for whom the new point bounds their right sides are output to a list of maximum empty rectangles and a set of new active rectangles is begun. The new active rectangles are those which have their top side, bottom side, or left-hand side determined by the new point. For example, from the beginning of the sweep at xmin through point x1, there is a single active rectangle, (xmin,[ymin,ymax]). When the sweep encounters the point (x1,y1), the fourth side of (xmin,[ymin,ymax]) is defined and the maximum empty rectangle (xmin,ymin;x1,ymax) is output to the list. Between x1 and x2, there are three active rectangles: (xmin,[ymin,y1]), (xmin,[y1,ymax]), and (x1,[ymin,ymax]).

The algorithm is implemented by means of the binary trees shown in FIGS. 7 and 8. Each node 701 in these trees represents an active rectangle, and each tree represents the active rectangles as they exist between two given points on the x axis. Tree 703 represents the active rectangles which exist between xmin and x1; tree 705 represents the ones between between x1 and x2; tree 707 represents the ones between x2 and x3; and tree 801 represents the ones between x3 and xmax.

The structure of these trees can be best seen in tree 707. Tree 707 is made up of leaf nodes 709, which have no children, and interior nodes 717, which always have two children. Interior nodes 717 include a single root node 719. Tree 707 further has three levels 711 between leaf nodes 709 and root node 719. Leaf nodes 709 represent all of the active rectangles which have their left sides at xmin; the next level up represents all of the active rectangles which have their left sides at the first point, here, x1; the next level represents all of the active rectangles which have their left sides at the next point, here x2. Since tree 707 represents the active rectangles between points x2 and x3, there is no higher level. Within a level, the nodes are ordered by y interval, beginning with the y interval which begins at ymin and ending with the y interval which ends at y max. The children of an interior node 717 at a level x(k) represent active rectangles at level x(n<k) whose y intervals have two properties: they do not overlap, and they all fit within the y interval of the interior node 717. Thus, interior node 717 representing the active rectangle (x1,[ymin,y3]) has as its children the leaf nodes representing the active rectangles (xmin,[ymin,y1]) and (xmin,[y1,y3]), while interior node 717 representing the active rectangle (x2,[ymin,ymax]) has as its children the interior node 717 representing the active rectangle (x1,[ymin,y3]) and the leaf node representing the active rectangle (xmin,[y3,ymax])

The manner of operation of the algorithm can be seen with reference to FIGS. 6 through 8. The sweep of the line from left to right along the x axis is represented by a list of points ordered by their x coordinate. Each point is applied in turn to the tree which represents the active rectangles prior to the x coordinate. From rain to x1, there is a single active rectangle (xmin,[ymin,ymax]) and the tree has the form of tree 703, which contains a single leaf node for the active rectangle. When the sweep reaches (x1,y1), the active rectangle represented by tree 703 acquires a right side and is output to the list as maximum empty rectangle (xmin, ymin;x1,ymax). After (x1,y1), there are three active rectangles, as may be seen from tree 705. In terms of tree manipulation, when the point (x1,y1) is applied to nee 703, the result is that node 701 is split in two to reflect the fact that there are now two active rectangles whose left side is at xmin and a new node has been created for the new active rectangle whose left side is at x1.

When the sweep reaches (x2,y3), the active rectangles whose y intervals included y3 acquire a right side and are output to the list. The new maximum empty rectangles are the following:

(xmin,y1;x2,ymax)

(x1,ymin;x2,ymax)

The new active rectangles are (xmin,[y1,y3]), (xmin,[y3,ymax]), (x1,[ymin,y3]), (x2,[ymin,ymax])

The general algorithm for generating maximum empty rectangles is the following:

For each point on a list of points sorted by their x coordinates, do the following:

1. Traverse the tree from root to leaves outputting a maximum empty rectangle corresponding to each node whose y interval contains the y coordinate of the current point 2. Split the leaf node whose y interval contains the y coordinate of the new point.

3. Do with the following with the parent node with 3 potential children (children whose x coordinate is less than the parent's and whose non-overlapping intervals are included in the parent's y interval):
   a. reset the parent's y interval to a new y interval which has the new point's y coordinate as one bound and includes the y intervals of two of the potential children;
   b. make the two potential children actual children of the parent;
   c. make the third potential child a potential child of the parent's parent;
   d. repeat with the parent's parent until the parent whose interval has been reset has no parent.

4. Create a new root node which has the x coordinate of the new point and the y interval [ymin,ymax] and make the root nodes of the two subtrees resulting from the operation of steps 1 and 2 children of the new root node.

Applying the algorithm to the transformation from tree 705 to tree 707, in the first step, the nodes are traversed from top to bottom, proceeding from left to right and the maximum empty rectangles are output in the order indicated above. Then, tree 705 is made into tree 707 by first splitting leaf node (xmin,[y1,ymax]) to produce the new leaf nodes (xmin,[y1,y3]) and (xmin,[y3,ymax]). Root node (x1,[ymin,ymax]) now has three potential children, (xmin,[ymin,y1])

(xmin,[y1,y3])

(xmin,[y3,ymax])

The y interval of the root node is reduced to include the y intervals of only two of the three potential children, in this case, (xmin,[ymin,y1]) and (xmin,[y1,y3]), and these two nodes are made actual children of the root node. At this point, there are two subtrees: subtree 715 and subtree 713. Since the root node has no parent, the next step is to make a new root node (x2,[ymin,ymax]) and make subtrees 715 and 713 children of the new root node.

The algorithm transforms tree 707 into tree 801 as follows: On the root to leaf traversal, the following maximum empty rectangles are output:

(xmin,y1;x3,y3)

(x1,ymin;x3,y3)

(x2,ymin;x3,ymax)

Then the leaf node (xmin,[y1,y3]) is split, giving parent node (x1,[ymin,y3]) three potential children. The parent node's y interval is adjusted to [ymin,y2] and the two children with the y intervals [ymin,y1] and [y1,y2] are made actual children. The potential child (xmin,[y2,y3]) is made a potential child of the parent of the node (x1,[ymin,y2]), i.e., the root node of tree 707, (x2,[ymin,ymax]), which now has three potential children, namely (x1,[ymin,y2]), (xmin,[y2, y3]) and (xmin,[y3,ymax]). The part of the algorithm dealing with nodes with three potential children is then applied to the root node of tree 707, resulting in the creation of the two subtrees whose root nodes are (x1,[ymin,y2]) and (x2,[y2,ymax]). These nodes then become the children of the new root of tree 801.

The algorithm just described is easily implemented using well-known methods of locating points in images and known methods of representing binary trees as data structures and manipulating such data structures.

Finding Maximum Empty Rectangles 205 Defined by Character Rectangles 203

When the points of FIG. 6 are replaced by rectangles such as character rectangles 203, the fact that the rectangles have width and height complicates the problem of finding the maximum empty rectangles considerably. With points, all of the maximum empty rectangles 205 and all of the new active rectangles 607 resulting from the encounter with the point are produced immediately upon the encounter. The new active rectangles 607 fall into three classes: those whose bottoms are at the point, those whose tops are at the point, and one whose left-hand side is at the point. With rectangles, the maximum empty rectangles 205 and the first two classes of new active rectangles 607 are produced when the left-hand side of the character rectangle 203 is encountered, but the new active rectangle 607 whose left-hand side is defined by the right hand side of the character rectangle 203 cannot be produced until the right-hand side of the character rectangle 203 is encountered. Moreover, a given character rectangle 203 continues to affect the generation of active rectangles until other character rectangles whose left sides have higher x coordinates have effects which supersede the effects of the left side of the given character rectangle 203. For this mason, a given character rectangle 203 remains "active" even after its right-hand side has been encountered. Thus, when a left-hand side of a given character rectangle is encountered, maximum empty rectangles must be output, new active rectangles whose tops and bottoms touch the given character rectangle 203 must be generated, and it must be determined whether any character rectangle has been rendered inactive by the left-hand side. When the right-hand side of the given character rectangle 203 is encountered, a new active rectangle whose left-hand side touches the right-hand side of the given character rectangle 203 must be generated.

In the following, the algorithm employed in a preferred embodiment of segmenter 401 will be explained in detail using a simple example image with four character rectangles 203. The algorithm works in the manner explained using the example on images having far more character rectangles 203. A preferred embodiment of segmenter 401 has been used on images ranging from images of typewritten letters, which typically have about 2000 character rectangles 203, through images of large-format dictionary pages, having up to 15000 character rectangles 203.

Figure 9:
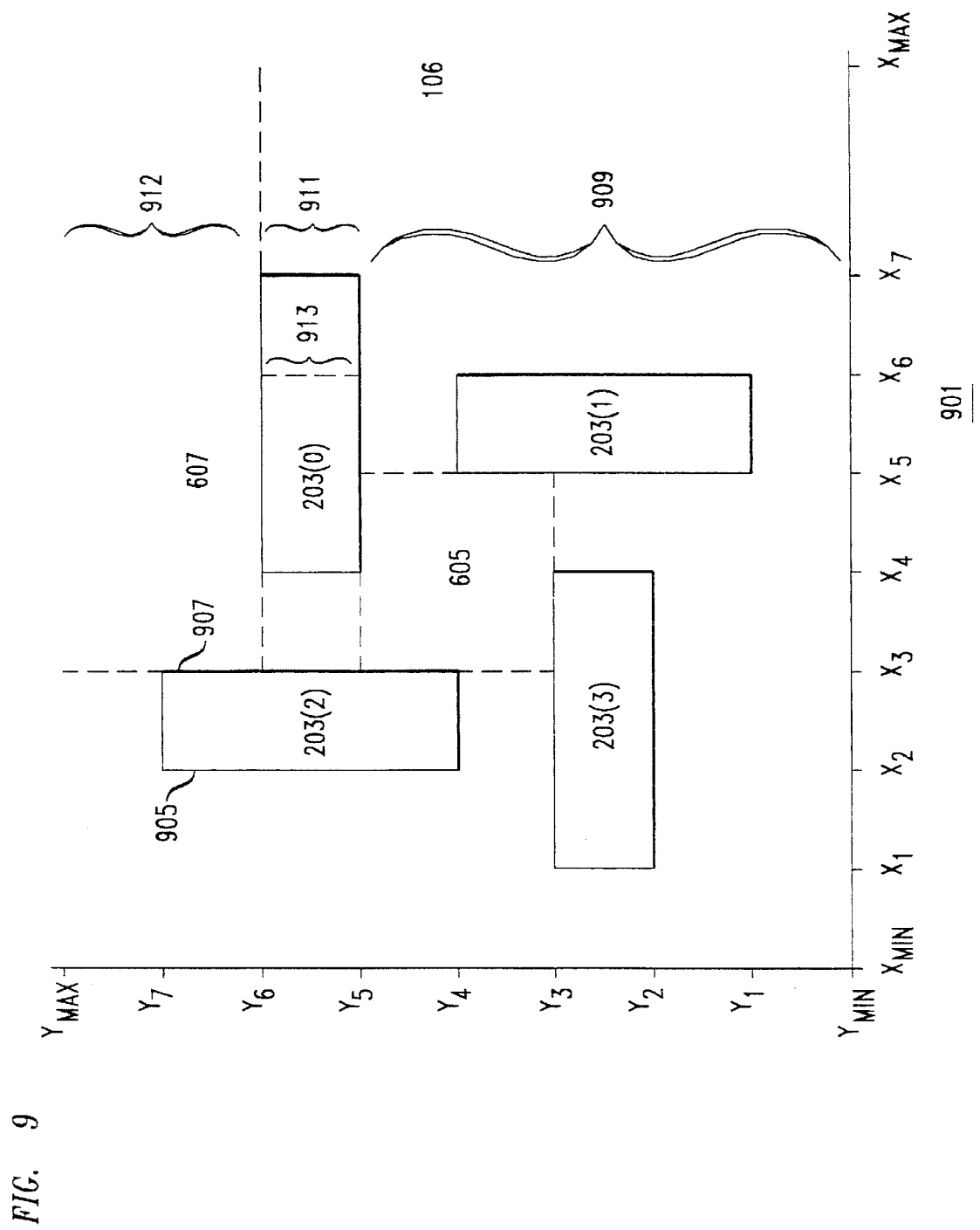
FIG. 9 is a diagram of an image with a set of character rectangles.

The Example Image: FIG. 9

FIG. 9 shows example image 901. Example image 901 contains four character rectangles 203(0 . . . 3). The four rectangles are surrounded by non-text space 106. A maximum empty rectangle 605 in FIG. 9 is a rectangle each of whose four sides touches an edge of the image or a side of a character rectangle 203. One such maximum empty rectangle 605 is shown in FIG. 9. Similarly, an active rectangle 607 in FIG. 9 is a rectangle whose left-hand side, top, and bottom are touching a side of a character rectangle 203 or a left-hand, top, or bottom edge of image 901, but whose right-hand side has not yet reached a left-hand side of a character rectangle 203 or the right-hand edge of image 901.

Each character rectangle 203 has a left-hand side 905 and a right-hand side 907. As a line perpendicular to the x axis sweeps across image 901, old active rectangles 607 become maximum empty rectangles 605 each time a left-hand side 905 of a character rectangle 203 is encountered and new active rectangles 607 may be generated each time a left-hand side or a right-hand side of a character rectangle 203 is encountered. Such an encounter with a left-hand side 905 or a right-hand side 907 is termed herein an event. If the sweep line encounters both a left-hand side 905 and a right-hand side 907, as occurs in FIG. 9 at x4, the result is two events, one for each side.

In a preferred embodiment, an event is specified by means of five pieces of information:

The position of the sweep line on the x axis when the event occurred;

the number of the rectangle whose side was encountered;

whether the side encountered was a left-hand side 905 or a right-hand side 907; and the location of the side. The location is expressed by three intervals: ymin to the beginning of the side; from the beginning of the side to the end of the side; and from the end of the side to ymax.

The intervals for the right-hand side of rectangle 203(0) are specified in FIG. 9 as 909, 911, and 912. Thus, the event which occurs when the sweep line encounters right-hand side 907 of rectangle 203(0) at x7 is specified by the values:

x7, 0, right, [ymin,y5], [y5,y6], [y6,ymax]

Figure 10:
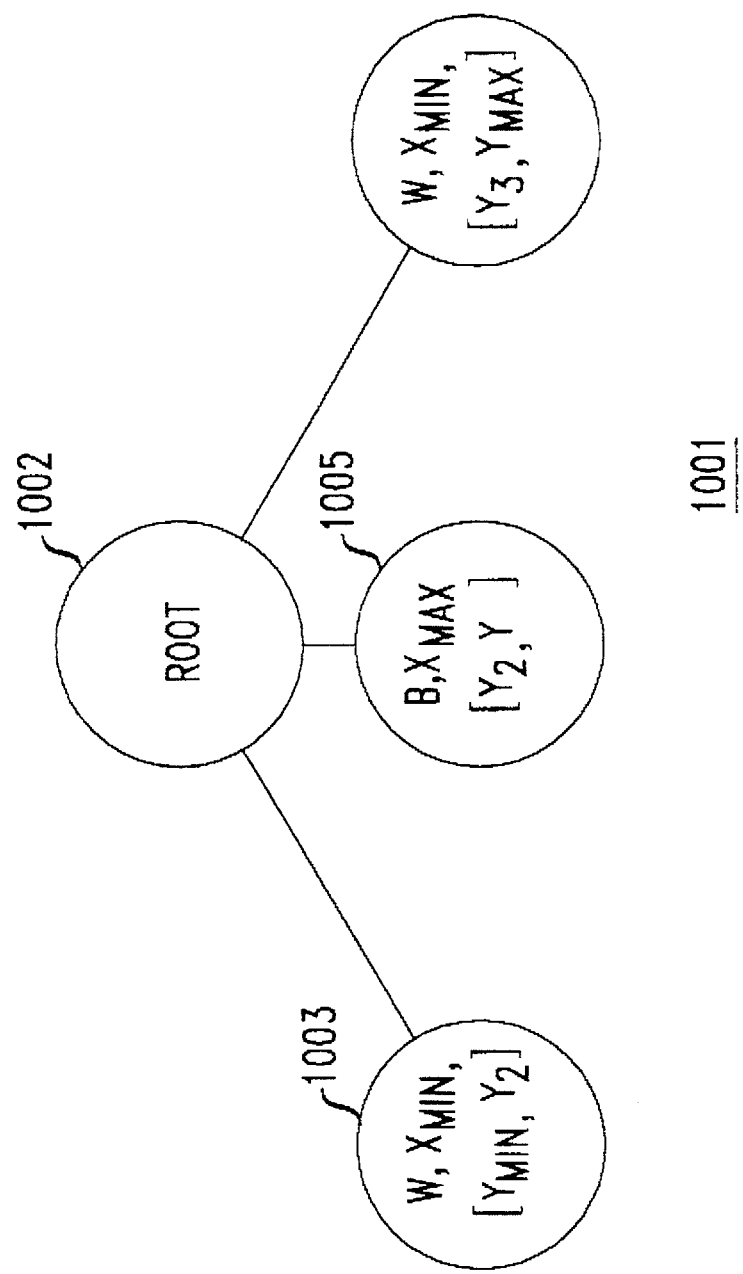
FIG. 10 is a diagram of a logical tree of active non-text rectangles and active character rectangles.

FIG. 10 shows logical tree 1001 which represents the active rectangles of image 901 at x1. As indicated above, character rectangles 203 are active from the location on the x-axis at which their left-hand sides are encountered to the location of the x-axis at which the y interval defined by the left-hand side no longer affects the generation of active rectangles. Consequently, logical tree 1001 has a node for character rectangle 203(3) as well as for the active rectangles 607 of non-text 106 and is no longer binary. An active non-text rectangle 607 is represented in a node 1003 by the following values:

W, indicating an active non-text rectangle 607;

the x position of the rectangle's left side; and the interval on the Y axis corresponding to the rectangle's left side.

An active character rectangle 203 is represented in a node 1005 by the following values:

B, indicating a character rectangle 203;

xmax, indicating that the right-hand side of the character rectangle 203 hasn't been reached (if it has, xmax is replaced by the x position of the right-hand side); and the interval on the Y axis corresponding to the character rectangle 203's left side.

As before, the children of a node have a range of y intervals which do not overlap and which fit within the range of y intervals specified for the parent, and the children represent active rectangles whose left sides are at lower positions on the x axis than those of their parents. Because a left-hand side event does not result in the creation of a new active non-text rectangle 106 beginning at the x position of the event, root node 1002 does not specify an active rectangle.

Representations of Lists and Trees in a Preferred Embodiment: FIGS. 11–14

Figure 11:
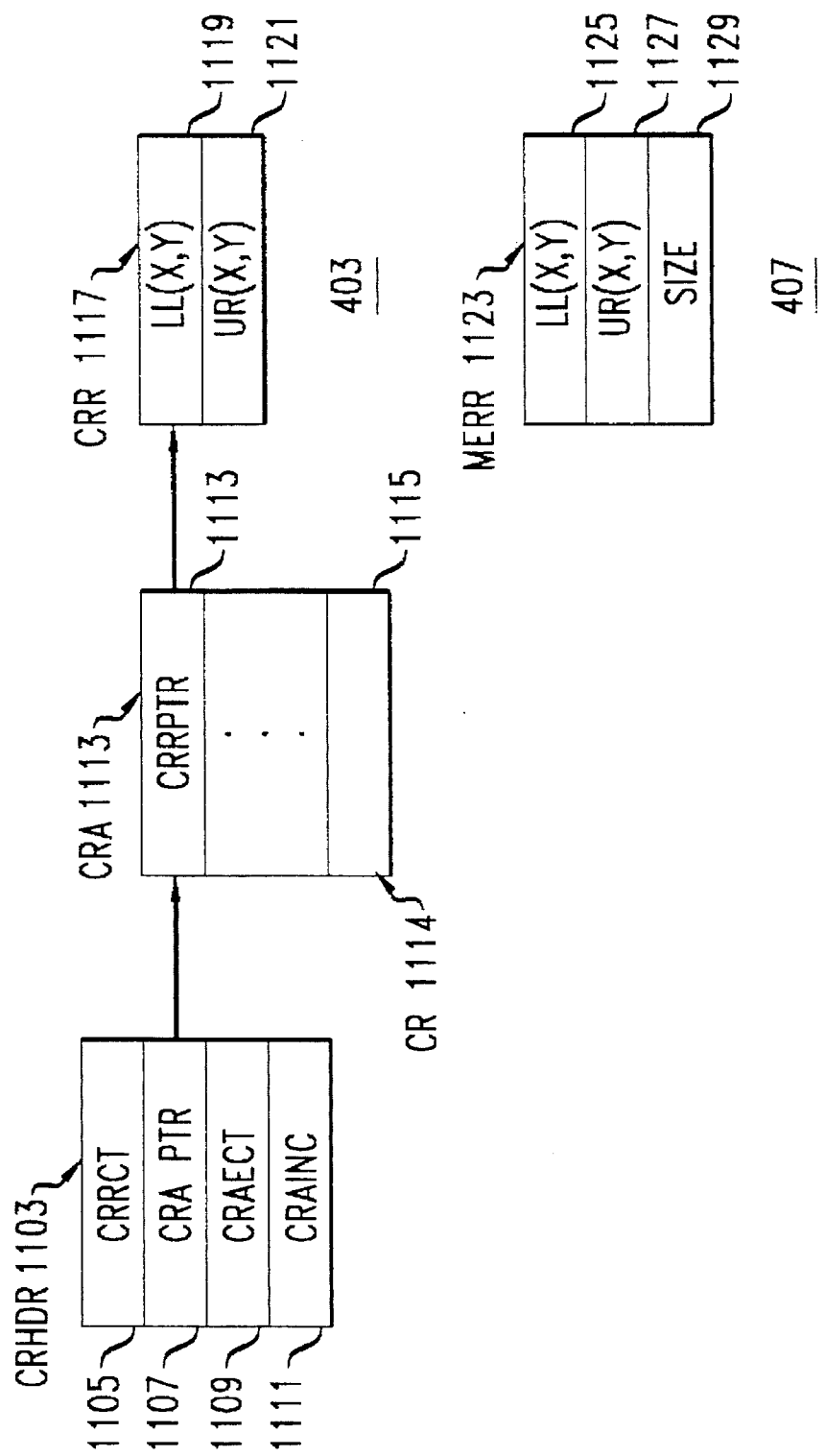
FIG. 11 is a diagram of the data structures used to represent character rectangles and maximum empty rectangles.

FIG. 11 shows the data structures used to implement character rectangle list 403 and maximum empty rectangle list 407 in a preferred embodiment. Both lists are implemented by means of records representing the rectangles. Each record is pointed to by an element of an array of pointers, and the array of pointers is pointed to by a header which contains the information necessary to manage the list. Details are shown only for list 403. Beginning with the record, character rectangle record 1117 contains the x,y coordinates of the lower left-hand corner of the character rectangle represented by the array in field 1119 and the coordinates of the upper right-hand corner in field 1121. Character record array 1113 is an array of pointers (CRRPTR 1115) to character rectangle records 1117. Character rectangle header 1103, finally, includes a pointer, CRAPTR 1107, to CRA 1113, and fields for administrative information including the current number of CRRs 1117 (CRRCT 1105), the total number of entries in CRA 1113 (CRAECT 1109), and the mount to be added to CRA 1113 when it is expanded (CRAINC 1111). Maximum empty rectangle list 407 is implemented similarly, except that maximum empty rectangle record (MERR) 1123 contains not only the coordinates of the lower left-hand and upper right-hand corners in fields 1125 and 1127, but also a size value which is used for sorting purposes in field 1129.

Figure 12:
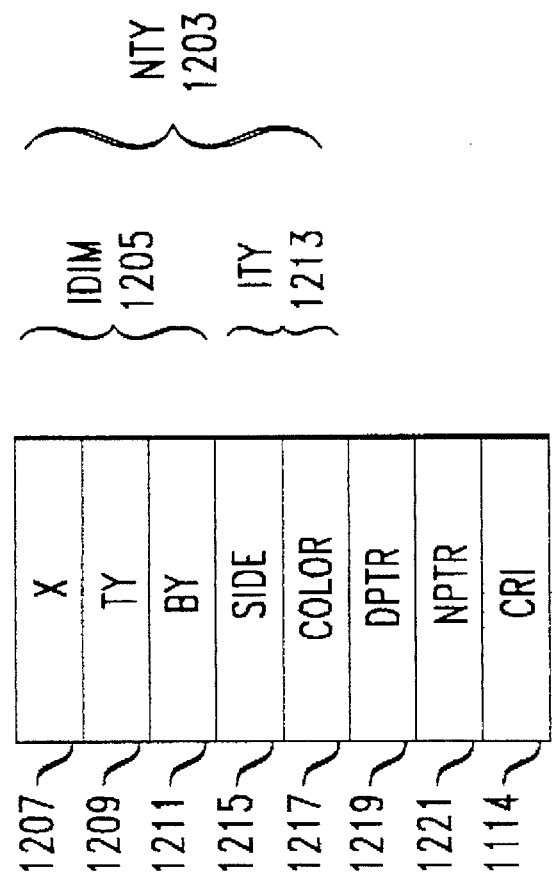
FIG. 12 is a diagram of the data structure used to represent nodes in lists and trees.

FIG. 12 shows the data structure used in a preferred embodiment to implement nodes in a list of events and nodes in the tree of active rectangles. The fields include interval dimensions (IDIM) fields 1205, which define an interval on a line which is perpendicular to the x axis at a point on the x axis, interval type fields 1213, which indicate whether the interval is a left-hand side, a right-hand side, or neither, and the color of the interval. As will be explained in more detail later, combinations of values in these fields determine the type of node represented by the data structure. Consequently, these fields together make up node type information 1203.

Continuing with the details of the fields, X field 1207 indicates a point on the x axis of image 103; TY field 1209 indicates the higher of the points on the y axis and BY field 1211 the lower of the points on the y axis; together, these fields specify a y interval. SIDE 1215 specifies whether the node represents a left side, a right side, or no side; COLOR 1217 specifies whether the side or rectangle represented by the node is in non-text 106 or in a character rectangle 203. DPTR 1219 is a pointer to a node 1201 which is lower in the list or tree; NPTR 1221 is a pointer to a node which is on the same level in the list or tree. CRI 1114 is an index to the element in character rectangle array 1113 which contains the pointer to the character rectangle record 1117 which represents the character rectangle 203 which in turn is represented by node 1201.

Figure 13:
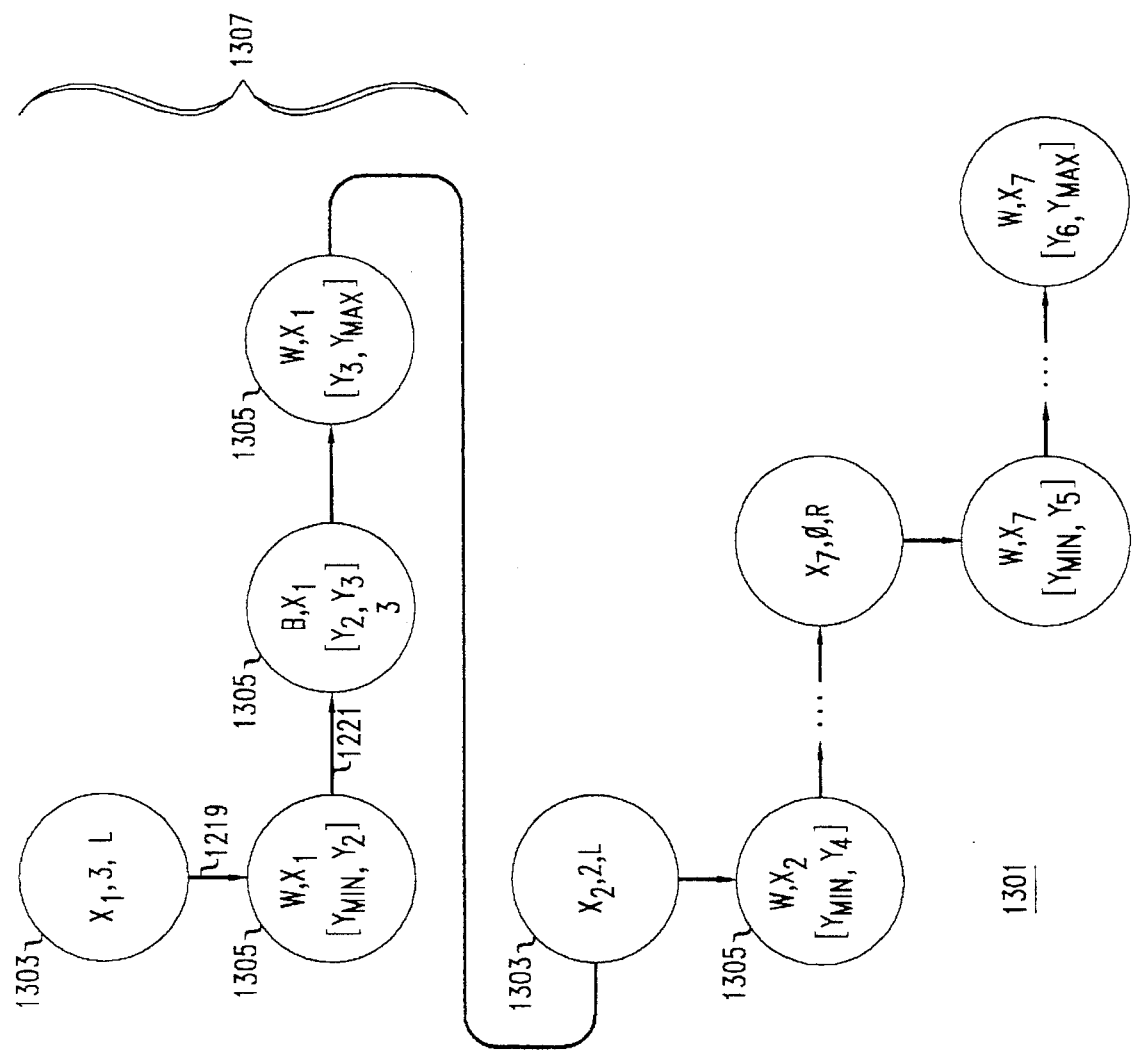
FIG. 13 is a diagram of an event list.

FIG. 13 shows event list 1301. Event list 1301 is a list of the events which produce maximum empty rectangles 605 and active rectangles 607 when an image is conceptually swept by a line as described above. In a preferred embodiment, event list 1301 is produced by sorting character rectangle list 403 to obtain the positions relative to the x and y axes of the left and right hand sides of character rectangles 203. In event list 1301, the sides are ordered by increasing x coordinate and by side. For a given x coordinate, all of the right-hand sides are listed by increasing bottom y coordinate and then all of the left-hand sides by increasing bottom y coordinate.

In a preferred embodiment, event list 1301 is implemented using nodes 1201 to represent the sides. For each event, there is an event sequence 1307 of nodes 1201 representing the event. The event sequence consists of an event header node 1303 and at least three interval nodes 1305. Event header node 1303 indicates the x coordinate of the event, the index in CRA 1113 of the pointer to the character rectangle record 1117 of the character rectangle causing the event, and the side of the character rectangle 203 causing the event. The information is contained in the expected fields of node 1201. Event header node 1303 is linked via DPTR 1219 to the first of the interval nodes; the interval nodes are linked to each other by NPTR 1221, and the last of the interval nodes is linked to the next event header node 1303 by the same pointer. The interval nodes 1305 are ordered by y values; each node specifies its color, the x coordinate of the event, and the y values.

Event list 1301 of FIG. 13 shows portions of the event list for FIG. 9. Thus, the first header node begins the event sequence 1307 for the left-hand side of character rectangle 203(3); accordingly, the header node specifies x1,3, and L. There is only one left-hand side at x1; therefore, there are only three interval nodes, one for the non-text interval [ymin,y2], one for the left-hand side of rectangle 203(3), [y2,y3], and one for the non-text interval [y3,ymax]. The remainder of event list 1301, which is only sketched, is structured similarly. Thus, the next event sequence 1307 is for x2, the position of the left-hand side of character rectangle 203(2), and the next after that is for x3, the position of the right-hand side of character rectangle 203(2). At x4, there are two event sequences 1307, one for the right-hand side of character rectangle 203(0) and the other for the left-hand side of character rectangle 203(3).

Figure 14:
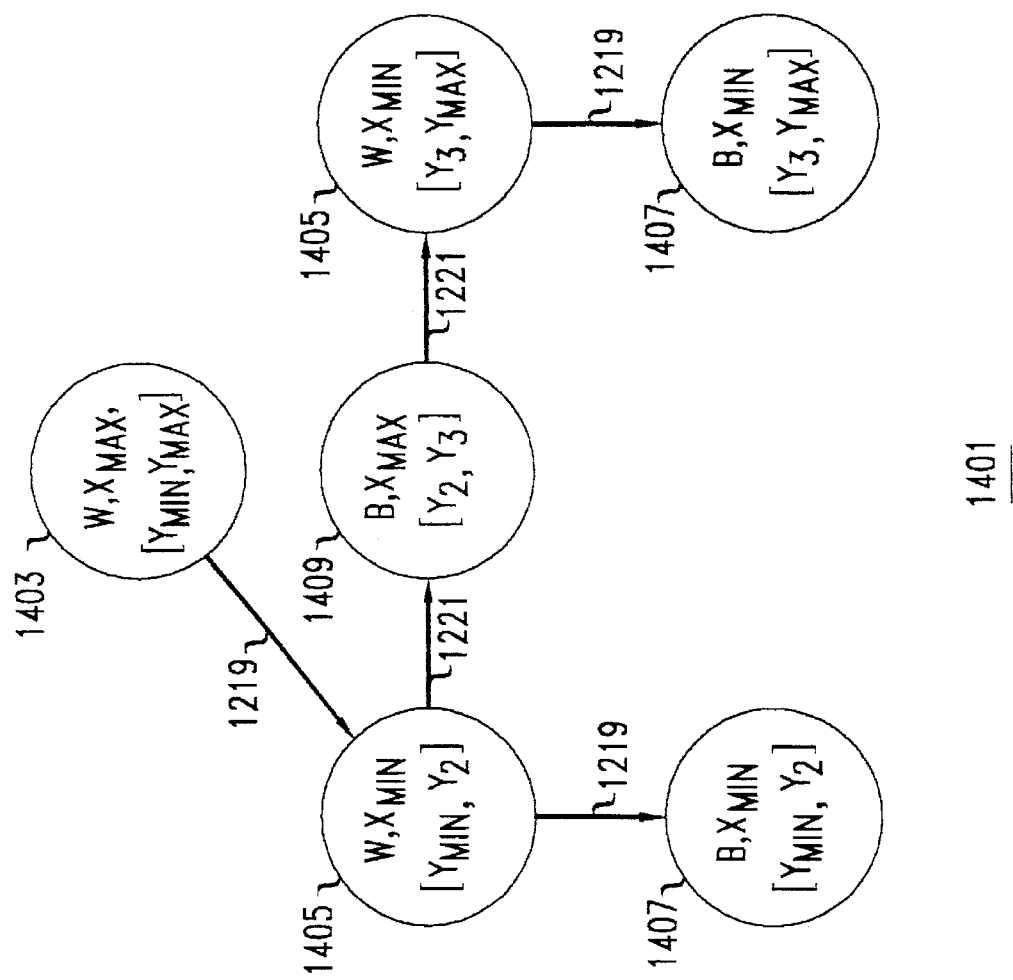
FIG. 14 is a diagram of an implementation of a logical tree of active non-text rectangles and active character rectangles.

FIG. 14 shows how logical tree 1001 of FIG. 10 is implemented using nodes 1201. Active rectangle tree 1401 has four types of nodes: root node 1403, active non-text rectangle nodes 1405, active character rectangle nodes 1409, and label nodes 1407. Root node 1403 is the root of logical tree 1401; it does not represent any active rectangle. Nodes 1405 represent active non-text rectangles 607; nodes 1409 represent active character rectangles 203. Label nodes 1407 label active non-text rectangle nodes 1405 which have no child nodes.

Relationships between the nodes are the following: the descendents of a given active non-text rectangle node 1405 include all of the nodes 1405 and 1409 whose y intervals fit within the y interval of given non-text rectangle node 1405. Active character rectangle nodes 1409 do not have children. Order among siblings (children of the same parent) is left to right by y interval. The relationships between the nodes are expressed by means of the pointers DPTR 1219 and NPTR 1221 in node 1201. Siblings are linked by NPTR 1221; the leftmost of a group of siblings is linked to the parent by means of the parent's DPTR 1219; DPTR 1219 also links an active non-text rectangle node 1405 with no children to its label node 1407.

The contents of NTY fields 1203 identify the node types; thus, root node 1403 is identified by the values xmax,[ymin, ymax]; active non-text rectangle nodes 1405 are indicated by the color value W; active character rectangle nodes 1409 are indicated by the color value B; label nodes 1407 have the color value B and the same x value and y interval as the leaf nodes they label.

Operation of MER Locator 405: FIGS. 15-18

In a preferred embodiment, MER locator 405 locates maximum empty rectangles 605 by applying an event sequence 1307 from event list 1301 for the image to the current active rectangle tree 1401. In broad terms, MER locator 405 first traverses active rectangle tree 1401 from root to leaves to determine which non-text active rectangles 605 have received a fourth side and consequently must be written to maximum empty rectangle list 407; then MER locator 405 traverses active rectangle tree 1401 from leaf to root to remove nodes 1405 which no longer represent active non-text rectangles, to remove nodes 1409 for character rectangles which will have no further effect on the generation of maximum empty rectangles 605, and to add nodes 1405 and 1409 representing the new active rectangles resulting from the event represented by event sequence 1307. The above will be explained in more detail using two examples based on FIG. 9. The first will show how MER locator 405 generates active rectangle tree 1401 in the interval x1,x2 from the initial active rectangle tree and the second will show how MER locator 405 generates the tree 1401 in the interval x5,x6 in response to the event which occurs at x5.

Figure 15:
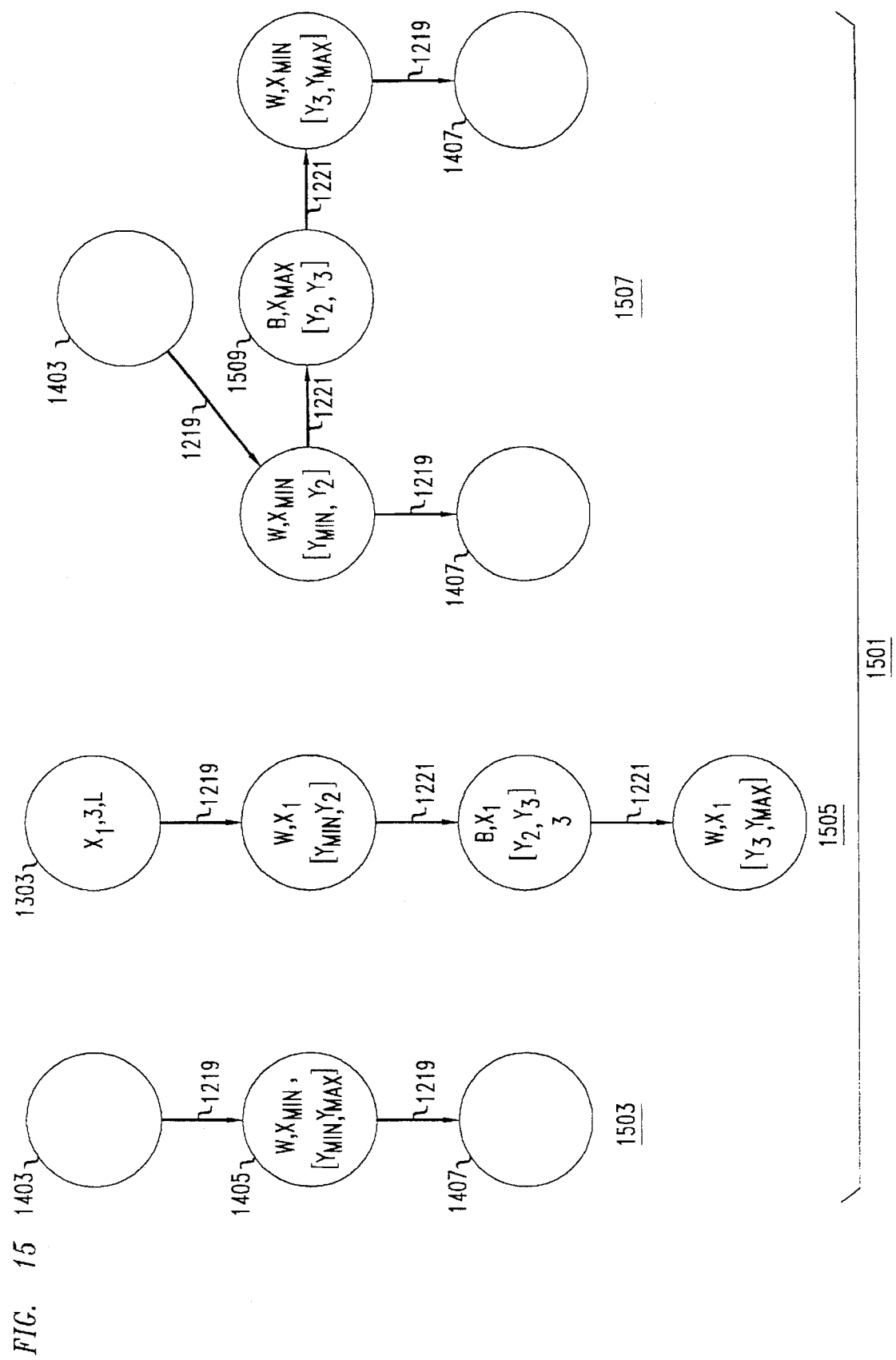
FIG. 15 is a diagram of a first example of the operation of the maximum empty rectangle locator.

Beginning with the first example, which is illustrated in FIG. 15, the event which occurs at x1 is the encounter with left-hand side 905 of character rectangle 203(3). Event sequence 1307 for that event is shown at 1505. Header node 1303 indicates that the event occurred at x1 and that it was a left-hand side; the remaining nodes define the bounds of the left-hand side as previously indicated. The active rectangle tree 1401 to which event sequence 1505 is applied appears as tree 1503. The tree consists of root node 1403, a single non-text active rectangle node 1405 specifying the active rectangle (xmin,[ymin,ymax]), and label node 1407, since node 1405 has no children.

The first step in dealing with the event which occurs at x1 is to determine the maximum empty rectangles 605 bounded by the new left side. MER locator 405 does this by descending through tree 1503 from root to leaf looking for nodes 1405 whose y interval overlaps the new left side. For each such node, MER locator 405 outputs a MER record 1123 for the maximum empty rectangle 605 to MER list 407. In tree 1503, the single node 1405 of the tree has a y interval [ymin,ymax] which includes the black interval [y2,y3] from event sequence 1505. MER locator 405 consequently adds a single MER record 1123 to MER list 407. The dimensions of the new maximum empty rectangle 605 are (xmin, ymin;x1,ymax).

Having reached the single leaf of tree 1503, MER locator 405 begins making tree 1507. Following x1, there are three active rectangles to be concerned with: two active non-text rectangles, with y intervals of [ymin,y2] and [y3,ymax] respectively, and an active character rectangle with a y interval of [y2,y3]. As can be seen from FIG. 15, the rectangles are represented by sibling nodes which occupy the place of the single leaf node of the original tree 1503. Two of the sibling nodes are nodes 1405 representing active non-text rectangles; the third, node 1509, represents an active character rectangle. The x coordinate xmax in active character rectangle 1509 indicates that MER locator 405 has encountered the left hand side of the active character rectangle, but has not yet encountered the right hand side. Tree 1507 is built by duplicating the subtree of tree 1503 which includes all nodes but root node 1403. The duplication is done recursively beginning with label node 1407. As the nodes are duplicated, the y intervals they contained are set as required by the new left side. Then the duplicate trees are linked to root 1403, and finally, node 1509 representing active character rectangle 203(3) is inserted between the two duplicate trees to produce tree 1507.

Figure 16:
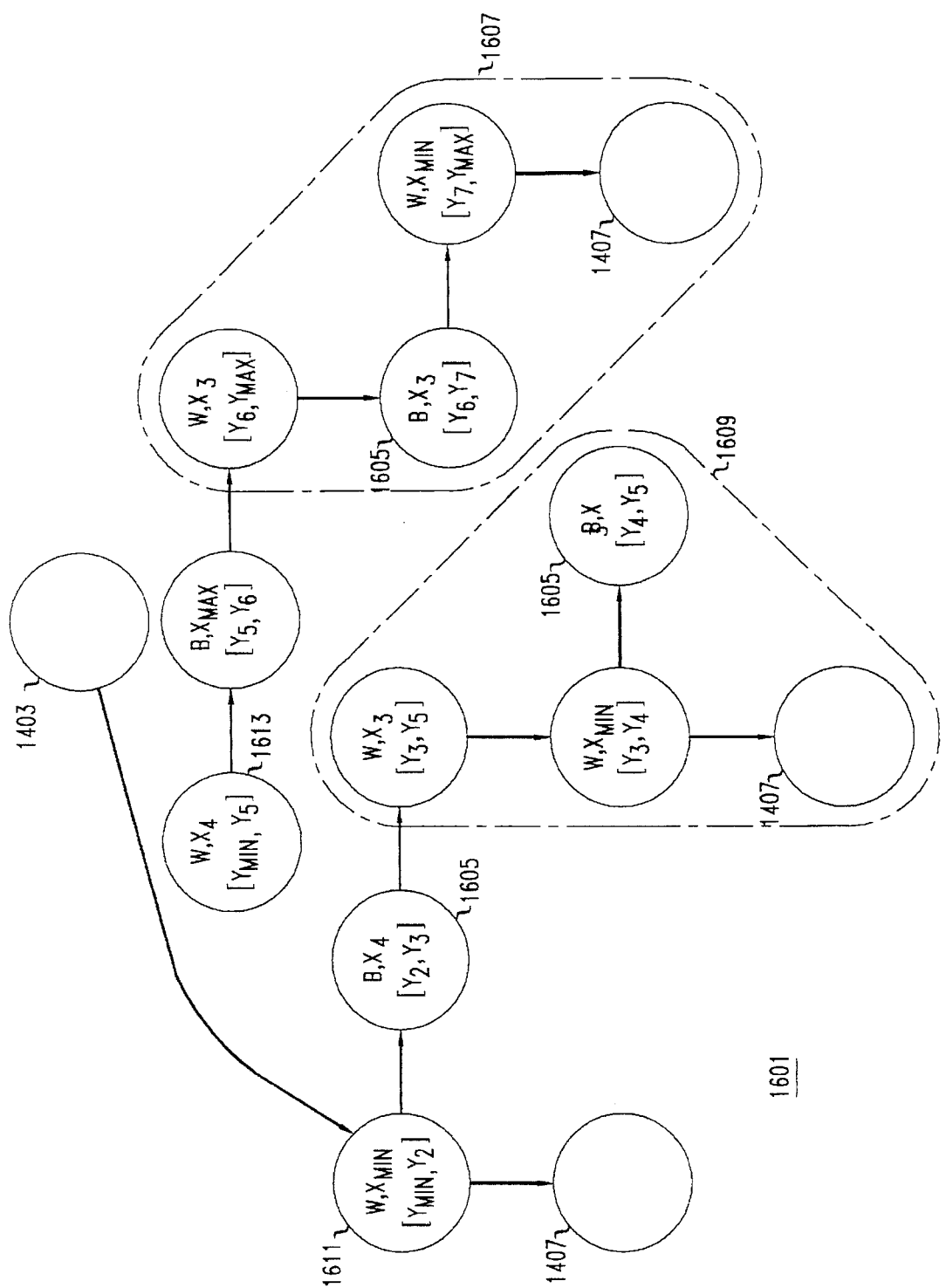
FIG. 16 is a first diagram for a second example of the operation of the maximum empty rectangle locator.
Figure 17:
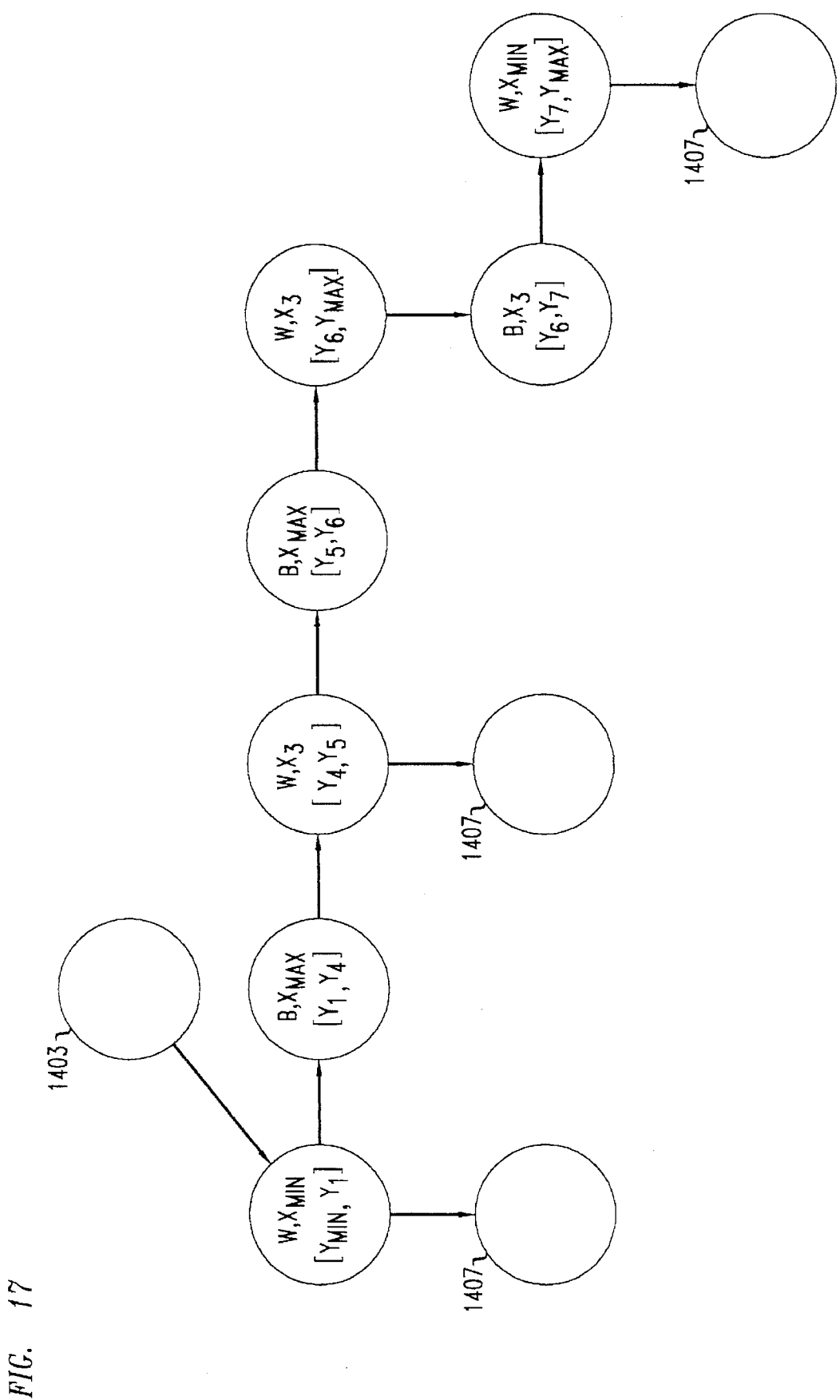
FIG. 17 is a second diagram for the second example.
Figure 18:
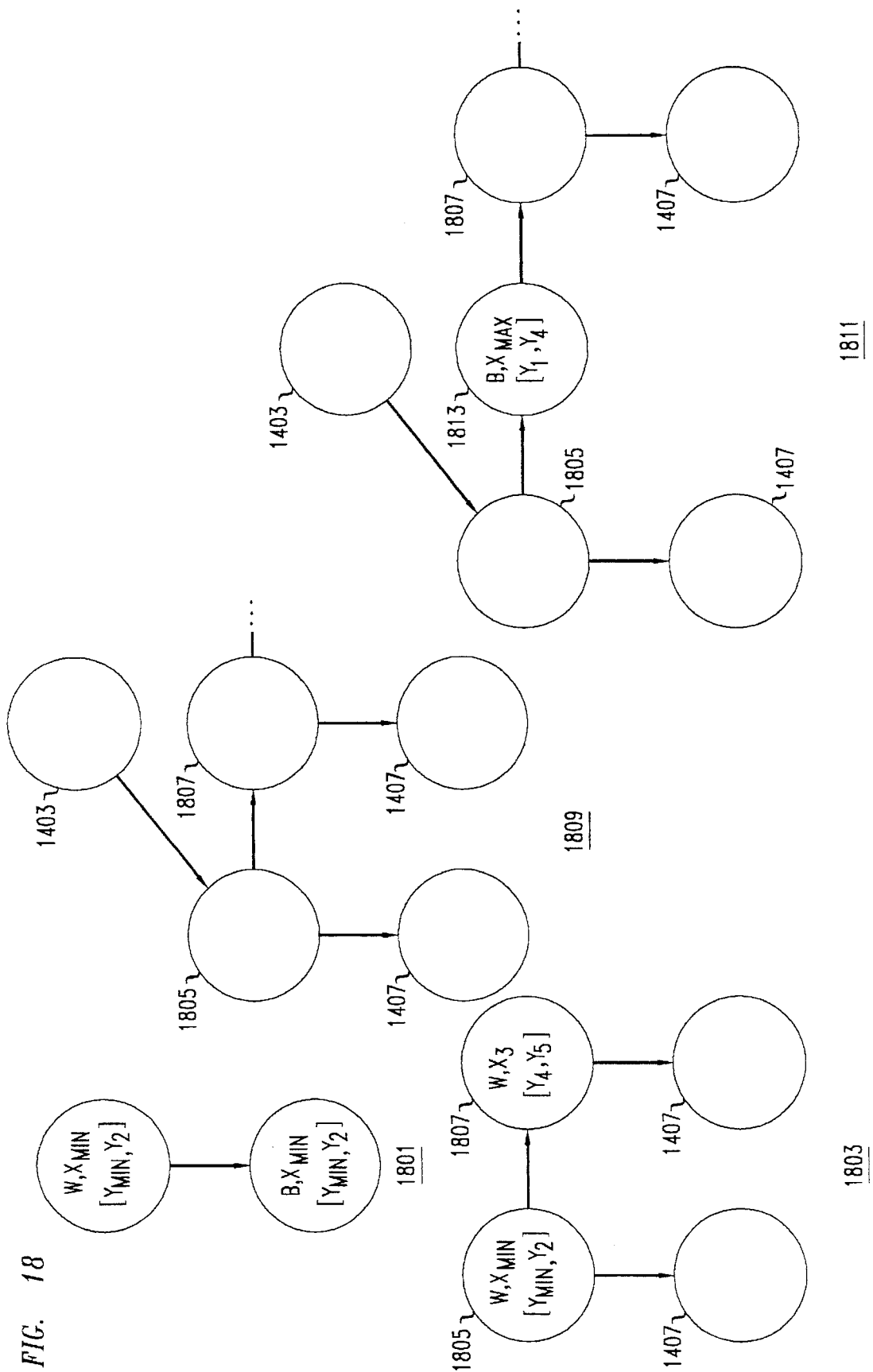
FIG. 18 is a third diagram for the second example.

Continuing with the second example, FIG. 16 shows active rectangle tree 1401 as it appears in the interval x4,x5 and FIG. 17 shows active rectangle tree 1401 as it appears in the interval x5,x6. Tree 1601 has several features of particular interest. First, there are the three nodes labeled 1605; each of these nodes represents a character rectangle 203 whose right side has been encountered, but which is still active because all or part of the y interval defining the character rectangle 203's height is still capable of affecting the generation of active non-text rectangles 607. The contents of nodes 1605 include the color, the x coordinate of the right-hand side, and that part of the y interval which is still affecting the generation of active non-text rectangles. If there is more than one such part, there is a node 1605 for each part. Thus, there is one node 1605 for character rectangle 203(3) and there are two for character rectangle 203(2). Two are required because the interval [y5,y6] of character rectangle 203(2) is covered by the left-hand side of node 203(0) and consequently no longer affects the generation of active non-text rectangles. The two nodes 1605 for character rectangle 203(2) were mated from a single node 1605 representing the interval [y4,y7] when the left-hand side of character rectangle 203(0) was encountered at x4.

As may be seen from the foregoing, nodes 1506 corresponding to a given character rectangle 203 remain in trees 1401 until other character rectangle 203s have been encountered whose y intervals operate together to completely block the effect of the y interval of the given character rectangle 203 on generation of subsequent active non-text rectangles 607. For example, the left-hand side of character rectangle 203(1) covers the entire y interval of character rectangle 203(3), so that the y interval of character rectangle 203(3) no longer has an effect beyond x5. Further, the top of rectangle 203(1) has the same y coordinate (y4) as the bottom of character rectangle 203(2); consequently, the interval [y4,y5] of 203(2) no longer has an effect beyond x5. As will be seen later, one effect of the encounter with the left-hand side of character rectangle 203(1) is the removal of the nodes representing the y interval [y2,y3] of character rectangle 203(3) and the y interval [y4,y5] of character rectangle 203(2) from tree 1601.

The relationship between a given node 1605 and the other nodes of a tree 1401 is described by the following: The given node 1605 replaces the node 1509 for the same character rectangle 203. It therefore has the same siblings. The given node 1605 and all of its siblings are children of the new node 1405 representing the active non-text rectangle 607 created as a result of the right-hand side event represented by node 1605. Thus, in subtree 1607 of tree 1601, the node 1605 with the contents (B,x3,[y6,y7]) is a child of the node 1405 with the contents (W,x3,[y6,ymax]) and has a single right-hand sibling with the contents (W,xmin,[y7,ymax]).

Subtree 1607 and its counterpart 1609 containing node 1605 for the y interval [y3,y5] were created when the left-hand side of character rectangle 203(0) was encountered at x3. As a result of that event, a subtree with the parent node (W,x3,[y3,ymax]) and the siblings (W,xmin,[y3,y4]), (B,x3, [y4,y7]), and (W,xmin,[y7,ymax]) was recursively duplicated, beginning with (B,x3,[y4,y7]) and continuing with (W,x3,[y3,ymax]). Then the y-intervals in the duplicate subtrees were set as required by the left-hand side of character rectangle 203(0), and each duplicate tree's parent node was linked to the sibling required by the parent node's y interval.

MER locator 405 generates tree 1701 from tree 1601 in response to event sequence 1307 representing the encounter of the sweep line with the left-hand side of character rectangle 203(1). Except for the contents of the nodes, event sequence 1307 is the same as sequence 1505 in FIG. 15 and is therefore not shown. As before indicated, the first step is traversing tree 1601 from root to leaf to output any maximum empty rectangles 605 resulting from the event. The traverse proceeds depth first. Thus, the first maximum empty rectangle output is (x4,ymin;x5,y5) resulting from the active non-text rectangle 607 represented by the node (W,x4,[ymin, y5]), the second is the maximum empty rectangle 605 (xmin,ymin;x5,y2) resulting from the rectangle represented by the node (W,xmin,[ymin,y2]), and so forth. The complete list of maximum empty rectangles 605 added to MER list 407 is:

(x4,ymin;x5,y5)

(xmin,ymin;x5,y2)

(x3,y3;x5,y5)

(xmin,y3;x5,y4)

The next step is to begin construction of tree 1701. The new tree is constructed bottom to top and left to right. The first step is to prune all nodes which have y intervals falling between y1 and y4, since such nodes either represent active non-text rectangles 607 which have become maximum empty rectangles 606 or character rectangles 603 which no longer have any effect on the generation of active non-text rectangles 607. Tree 1801 shows the result of the pruning. The next step is to recursively duplicate tree 1801 and adjust the y intervals of the duplicate trees as previously described to produce tree 1803 with the contents shown in FIG. 18. The next step is to replace node 1613 with the two new nodes 1805 and 1807 to produce tree 1809. The final step is to insert node 1813 representing character rectangle 203(1) between node 1805 and 1807 to produce tree 1701.

The description of the manner in which tree 1401 is modified has so far dealt only with modifications resulting from encounters with left sides of character rectangles 203; modifications resulting from encounters with right sides are far simpler: the result of such an encounter is the replacement of a node 1509 for an active character rectangle with a node 1605 and the creation of a new node 1405 representing the active non-text rectangle 607 whose left-hand side is at the x coordinate of the encounter. The new node 1405 becomes a child of root node 1403; all of the former children of root node 1403 whose y intervals fall within the y interval of the new node become children of the new node.

Summary of Operation of MER Locator 405

The operation of MER locator 405 can be summarized as follows: For each event sequence 1307 in event list 1301, do:

1. if the event sequence is for left-hand sides, for each left-hand side do:
    a. Traverse the tree root to leaf, depth-first, looking for nodes representing active non-text rectangles 607 whose y intervals overlap the y interval of the left-hand side. Output a maximum empty rectangle 605 for each such node encountered.
    b. Beginning at bottom left, go up each branch of the tree from the bottom left leaf of the branch to the root. In each branch,
        i. go up to the parent of the first node representing an active rectangle whose y interval overlaps the y interval of the left-hand side. In the course of going up the branch, prune all siblings whose y intervals overlap the new left side;
        ii. duplicate the nodes remaining in the branch below the parent; As the nodes are duplicated, set their y intervals as required by the new left side;
        iii. unless the parent is root 1403, replace the parent with the duplicate trees; if the parent is root 1403, make the duplicate trees children of root 1403; and
        iv. make a new node 1409 for the new left side and insert it between the duplicate trees.
    c. If the event sequence 1307 is for right-hand sides, for each right-hand side, do:
        i. Traverse the tree top to bottom anti node 1509 is found for the character rectangle 203 to which the right side belongs;
        ii. replace node 1509 with the corresponding node 1605;
        iii. Determine whether there is already a node 1405 in the tree representing an active non-text rectangle 607 identical with the one beginning at the right side; if there is, make node 1605 and its siblings children of that node; if there isn't, create the node, link it to root 1403, and make node 1605 and its siblings children of the new node.

Figure 19:
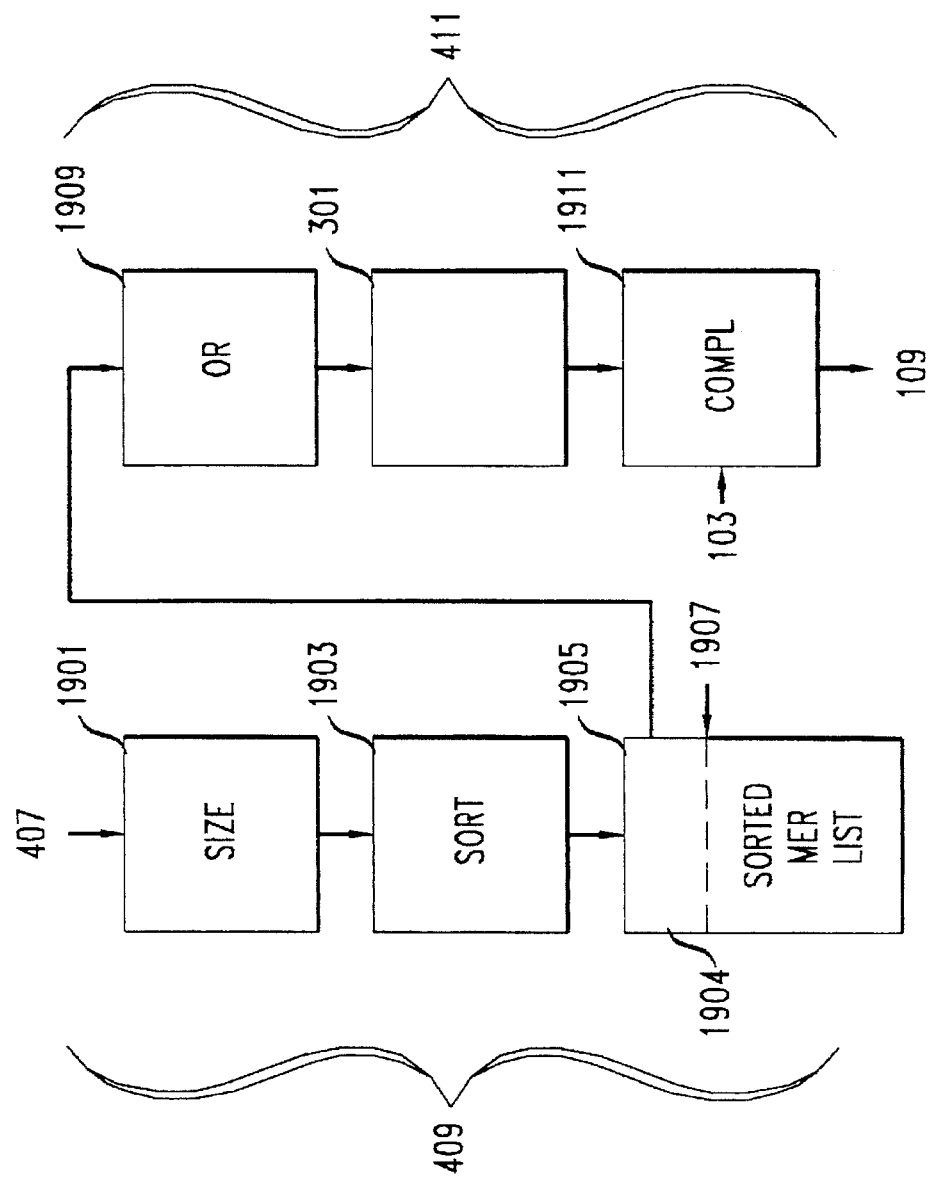
FIG. 19 is a block diagram of SD Sorter 409 and Text Extractor 411.

Production of Cover Set 301 from MER List 407: FIG. 19

Once maximum empty rectangle list 407 has been produced as just described by MER locator 405, the list can be processed by shape directed sorter 409 to produce cover set 301, and cover set 301 can be processed by text extractor 411 to extract text column images 109 from image 103. FIG. 19 is a schematic block diagram of shape directed sorter 409 and text extractor 411. The following discussion will deal first with sorter 409 and then with extractor 411.

Shape-directed Sorter 409

As previously mentioned, an important aspect of the present invention is the use of characteristic shape information for the class of images being segmented to sort the non-text areas of the image. The characteristic shape information used to sort the maximum empty rectangles in the embodiment presently being described is derived from the observation that columns in a Manhattan layout tend to be separated by long, thin rectangles of non-text 106. In geometric terms, the maximum empty rectangles which are significant for defining columns in the Manhattan layout are rectangles with a high aspect ratio (the ratio of the length of a rectangle's long side to the length of its short side). On the other hand, it may also be observed in a Manhattan layout that rectangles with an extremely high aspect ration are liable to be located between lines in a column or between characters in adjacent lines in a column and therefore not significant for the location of the column itself.

In a preferred embodiment, these observations are incorporated into SIZE component 1901 of shape-directed sorter 409. SIZE performs the following steps on each maximum empty rectangle 605 in MER list 407:

it divides the long side by the short side to obtain the aspect ratio;

if the aspect ratio is greater than 16, it is reduced to 16; and the maximum empty rectangle 605's size for purposes of sorting is computed by the formula area*log(aspect+1), where area is the area of the maximum empty rectangle 605 and aspect is the maximum empty rectangle 605's aspect ratio.

After the size value of each maximum entry rectangle 605 has been thus computed, it is stored in SIZE field 1129 of MER record 1123 for the maximum empty rectangle 605. Next, SORT component 1903 sorts MER list 407 by the value of SIZE field 1129 to produce sorted MER list 1905. The MER records 1123 for the maximum empty rectangles 605 with the largest sizes are at the front of list 1905.

The form of sorted MER list 1905 can be seen from the following sorted list of MERs which result when the maximum empty rectangles 605 of FIG. 9 are run through SIZE 1901 and SORT 1903. Each entry specifies the MER's corner coordinates and its size as computed by SIZE:

(x1,y3;x2,y7) 643.77516

(x6,y1;x7,y5) 643.77516

(x1,y1;x5,y2) 643.77516

(x3,y6;x7,y7) 643.77516

(x1,y3;x5,y4) 610.05446

(x3,y3;x4,y7) 610.05446

(x3,y4;x7,y5) 610.05446

(x4,y1;x5,y5) 610.05446

(x3,y3;x5,y5) 250.22613

Before the above list was made, a rectangle having the coordinates (x1,y1;x7,y7) was placed around character rectangles 203 so that the results of the son were not distorted by the rectangles which extend to the minimum and maximum x and y positions.

The next step is to select a subset 1904 of sorted MER list 1905 to use in the computation of cover set 301. In a preferred embodiment, the subset is selected by simply taking the largest 1% of sorted MER list 1905; in other embodiments, cover set 301 may be assembled from the first few maximum empty rectangles 605 on sorted MER list 1905 or what part of sorted MER list 1905 is selected for subset 1904 may be decided by observing the characteristics of the rectangles on the list.

Text extractor 411 has two components: OR component 1909 and Complement Component 1911. OR component 1909 computes the Boolean OR of the interiors of the maximum empty rectangles of subset 1904 to produce cover set 301; Complement component 1911 produces text column images 109 by using the coordinates of the complement of cover set 301 to locate the text columns in image 103. Techniques for both ORing the maximum rectangles and finding the complement are well known in the art. In particular, finding the OR of the maximum empty rectangles is described in Szymanski, T. G., and van Wyk, C. J., "GOALIE: A Space Efficient System for VLSI Artwork Analysis," *IEEE Design and Test of Computers*, vol. 2, no. 3, pp. 64–72, June, 1985.

Conclusion

The foregoing Detailed Description has disclosed to one of ordinary skill in the art how document reading apparatus may be constructed which includes a segmenter which embodies the principles of the invention and which is able to locate columns of text in images having the Manhattan layout. The principles disclosed herein are not, however, limited to Manhattan layouts, but may be applied with any class of images in which the non-text portion of the image has characteristic shapes. The Detailed Description has also disclosed methods for locating maximum empty rectangles defined by points in an image and maximum empty rectangles defined by rectangles in an image. These methods are usable not only in the present context, but in any context in which determining maximum empty rectangles in an image is desired.

The above being the case, the Detailed Description is to be understood as being in all respects as exemplary but not restrictive, and the scope of the invention is to be determined not from the Detailed Description, but rather from the appended claims as interpreted in light of the Detailed Description and the doctrine of equivalents.

What is claimed is:

1. A method for locating a set of maximum empty rectangles in an image which has x and y coordinates and which contains one or more other rectangles, each maximum empty rectangle being such that the maximum empty rectangle does not contain any part of any of the other rectangles and each of the maximum empty rectangle's four sides is bounded by a side of one of the other rectangles or a bound of the image, the method comprising the steps of:

providing representations of the vertical sides of the other rectangles in order of increasing x coordinate of the vertical side;

initializing a first list for receiving representations of the maximum empty rectangles;

sweeping the x coordinates by sequentially setting a present x coordinate to the x coordinate of each of the provided representations of vertical sides;

making an active rectangle representation representing all active rectangles, each of the active rectangles being a rectangle whose right-hand side is unbounded at the present x coordinate and those whose left-hand sides have a x coordinate less than the present x coordinate and are bounded by a right-hand side of one of the other rectangles or the left-hand bound of the image, which do not contain any part of any of the other rectangles, and whose right-hand sides are not bounded by any left-hand side of any other rectangle whose x coordinate is less than the present x coordinate;

determining at each setting of the present x coordinate from the representation of all active rectangles which, if any, of the active rectangles become maximum empty rectangles at the present x coordinate;

adding representations of any such maximum empty rectangles to the first list; and rearranging the representation of all active rectangles to represent the active rectangles whose x coordinates are less than the next sequential setting of the present x coordinate.

2. The method set forth in claim 1 wherein:

the representations of the vertical sides is a second list of the representations of the vertical sides of the other rectangles, each representation including the x coordinate and y interval of one of the vertical sides, the y interval defining a range of coordinates lying between a particular two of the y coordinates and the representations being ordered by increasing x coordinate and for a given x coordinate, with right-hand sides before left-hand sides and right-hand sides or left-hand sides for the given x coordinate being ordered by increasing y interval;

the active rectangle representation is a tree including at least a root node and one or more first nodes, each of the first nodes representing one of the active rectangles, and further sometimes including one or more second nodes, each of the second nodes representing one of the other rectangles whose left-hand side has an x coordinate which is less than the present x coordinate and a right-hand side whose x coordinate is greater than the present x coordinate and/or one or more third nodes, each of the third nodes representing one of the other rectangles whose right-hand side has an x coordinate which is less than the present x coordinate and the right-hand side defines some of the active rectangles of the active rectangle representation, each first node including the x coordinate of the active rectangle's left-hand side and the left-hand side's y interval, each second node including the y interval of the other rectangle's left-hand side, and each third node including the y interval of the other rectangle's left-hand side and the x coordinate of the right-hand side, and the second and third nodes having no children, and the tree being ordered such that the children of a first node which is a parent node are nodes representing other rectangles and active rectangles whose left-hand side is at an x coordinate which is less than the parent node's x coordinate and whose y intervals do not overlap and are contained in the parent's y interval and the children are ordered left-to-right by increasing y interval; and the steps of determining which of the active rectangles become maximum empty rectangles, adding representations of the maximum empty rectangles to the first list, and rearranging the representation of all active rectangles are carded out by steps comprising:

for each specification of a vertical side, do:

1. if the specification is for a left-hand side, do:
   a. traverse the tree root to leaf, looking for first nodes whose y intervals overlap the y interval of the left-hand side; add a representation of a maximum empty rectangle to the first list for each such first node;
   b. beginning at bottom left, go up each branch of the tree from the bottom left leaf of the branch to the root. In each branch,
      i. go up to the parent of the first node whose y interval overlaps the y interval of the left-hand side; in the course of going up the branch, prone all sibling nodes whose y intervals overlap the y interval of the left-hand side;
      ii. duplicate the subtree consisting of the nodes remaining in the branch below the parent; as the subtree is duplicated, set the y intervals in the nodes of the duplicate subtrees as required by the y interval of the left-hand side;
      iii. unless the parent is the root node, replace the parent with the duplicate subtrees; if the parent is the root node, make the duplicate subtrees children of the root node; and
      iv. make a new second node for the new left-hand side and insert it between the duplicate sub trees;
2. if the specification is for a right-hand side, do:
   a. traverse the tree top to bottom until a second node is found representing the other rectangle to which the right-hand side belongs;
   b. replace the second node with a third node representing the other rectangle;
   c. determine whether there is already a first node in the tree representing a rectangle identical with the other rectangle beginning at the x coordinate of the other rectangle's right-hand side; if there is, make the third node and its siblings children of that node; if there isn't, create the first node, link the first node to the root node, and make the third node and its siblings children of the new first node.

3. The method set forth in claim 1 wherein:

the active rectangle representation is a tree with at least a root node and one or more first nodes representing the active rectangles and further sometimes including one or more second nodes representing other rectangles whose y intervals define some of the active rectangles, the y interval defining a range of coordinates lying between a particular two of the y coordinates; and the step of determining at each setting of the present x coordinate from the representation of all active rectangles which, if any, of the active rectangles become maximum empty rectangles comprises the steps of:

for each representation of a vertical side which specifies a left-hand side, traversing the tree from root to leaves to determine which active rectangles have become maximum empty rectangles as a function of including the specified left-hand side in the definition of the active rectangles; and the step of rearranging the representation of all active rectangles comprises the steps of:

traversing the tree from leaf to root to remove the first nodes representing the active rectangles which have become maximum empty rectangles in consequence of the encounter and the second nodes whose y intervals no longer define active rectangles in consequence of the encounter and to add first nodes representing the new active rectangles resulting from the encounter with the specified left-hand side; and for each representation of a vertical side which specifies a right-hand side, adding a first node to the tree which represents any new active rectangle resulting from the encounter with the specified right-hand side.

4. A method for locating a set of maximum empty rectangles in an image which has x and y coordinates and which contains one or more points of interest, each maximum empty rectangle being such that the maximum empty rectangle does not contain any of the points of interest and each of the maximum empty rectangle's four sides intersects a point of interest or is bounded by a bound of the image, the method comprising the steps of:

providing representations of the points of interest in order of increasing x coordinate;

initializing a list for receiving representations of the maximum empty rectangles;

making an active rectangle representation representing all active rectangles, each of the active rectangles being a rectangle whose right-hand side is unbounded at the present x coordinate and those whose left-hand sides have a x coordinate less than a present x coordinate and intersect a point of interest or the left-hand edge of the image, which do not contain any of the points of interest, and whose right-hand sides do not intersect any point of interest whose x coordinate is less than the present x coordinate;

sweeping the x coordinates by sequentially setting the present x coordinate to the x coordinate of each of the provided points of interest, determining at each setting of the present x coordinate from the list of representations of points of interest and the active rectangle representation which of the active rectangles become maximum empty rectangles at the present x coordinate;

adding representations of any such maximum empty rectangles to the list for receiving representations of the maximum empty rectangles; and rearranging the active rectangle representation to represent all active rectangles whose x coordinates are less than the next sequential setting of the present x coordinate.

5. The method set forth in claim 4, wherein:

the active rectangle representation is a tree including a node representing each active rectangle, each node including the x coordinate and y interval of the left-hand side of the active rectangle represented by the node and the tree being ordered such that a node is either a parent node with two children or a leaf node with no children, the children of a parent node being nodes representing active rectangles whose left-hand sides have x coordinates less than the parent's x coordinate and whose left-hand sides have y intervals which do not overlap and fit within the y interval of the parent and the children are ordered from left to right by increasing y interval; and the steps of determining which of the active rectangles become maximum empty rectangles, adding the representations of the maximum empty rectangles to the list thereof, and rearranging the active rectangle representation are carried out by steps comprising:

1. splitting the leaf node whose y interval contains the y coordinate of the next point of interest to produce two nodes, one whose y interval's upper bound is the y coordinate of the new point and another whose y interval's lower bound is the y coordinate of the new point;
2. doing the following with the parent node when the splitting the leaf node could produce three nodes as children:
   a. resetting the parent's y interval to a new y interval which has the new point's y coordinate as one bound and includes the y intervals of two of the three nodes, whereby the two nodes can be children of the parent and the third node can be a child of the parent's parent;
   b. making the two nodes children of the parent;
3. repeating step 2 with the parent's parent until the parent whose interval has been reset has no parent;
4. creating a new root node which has the x coordinate of the new point and the y interval and making the root nodes of the two subtrees resulting from the operation of steps 1 through 3 children of the new root node.

6. A method for locating a set of maximum empty rectangles in an image having non-empty areas and empty rectangles which are described by x and y coordinates, the method comprising the steps of:

considering the areas in an order determined by increasing or decreasing values of one of either the x or y coordinates, performing the steps for each area of moving coordinates for any empty rectangle, whose last side is determined upon consideration of the area from a list of incomplete maximum empty rectangles, to a list of complete maximum empty rectangles, the last side being the side encountered latest in the order determined in the considering the areas step;

adding, coordinates for any empty rectangle not having a last side, whose top or bottom side is determined upon consideration of the area, to the list of incomplete maximum empty rectangles.

7. The method set forth in claim 6 wherein:

each of the areas has a leading edge and a trailing edge with respect to the increasing or decreasing values of the one coordinate; and the steps of moving coordinates for any empty rectangle whose last side is determined and of adding coordinates for any empty rectangle whose top or bottom side is determined, are performed when the value of the one coordinate is increasing and the respective leading edge is defined by the increasing value of the one coordinate.

\* \* \* \* \*